(12) United States Patent  (10) Patent No.: US 8,335,020 B2
Araki et al. (45) Date of Patent: Dec. 18, 2012

(54) IMAGE FORMING APPARATUS AND CONTROL METHOD THEREOF

(75) Inventors: Go Araki, Suntou-gun (JP); Yuuji Takayama, Suntou-gun (JP); Tomoyuki Saiki, Suntou-gun (JP); Hisashi Ishikawa, Urayasu (JP)

(73) Assignee: Canon Kabushiki Kaisha (JP)

( * ) Notice: Subject to any disclaimer, the term of this patent is extended or adjusted under 35 U.S.C. 154(b) by 494 days.

(21) Appl. No.: 12/604,506

(22) Filed: Oct. 23, 2009

(65) Prior Publication Data

US 2010/0103469 A1    Apr. 29, 2010

(30) Foreign Application Priority Data

Oct. 24, 2008  (JP) ................. 2008-274865

(51) Int. Cl.
    H04N 1/409    (2006.01)
(52) U.S. Cl. ...... 358/3.26; 358/1.9; 358/3.03; 358/3.06; 358/3.09; 382/236; 382/254
(58) Field of Classification Search ................ 358/1.9, 358/3.03, 3.06, 3.09; 382/236, 254
    See application file for complete search history.

(56) References Cited

U.S. PATENT DOCUMENTS

| | | | |
|---|---|---|---|
| 4,814,886 A | 3/1989 | Kuge et al. | |
| 5,068,914 A | 11/1991 | Klees | |
| 5,208,684 A * | 5/1993 | Itoh | 358/3.03 |
| 5,294,996 A | 3/1994 | Sobue | |
| 5,339,171 A | 8/1994 | Fujisawa et al. | |
| 5,351,312 A | 9/1994 | Sato et al. | |
| 5,479,263 A | 12/1995 | Jacobs et al. | |
| 5,649,031 A | 7/1997 | Nakamura et al. | |
| 5,708,514 A | 1/1998 | Higuchi et al. | |
| 6,002,493 A * | 12/1999 | Case | 358/3.06 |
| 6,101,285 A * | 8/2000 | Fan | 382/260 |
| 6,215,512 B1 | 4/2001 | Imaizumi et al. | |
| 6,215,561 B1 * | 4/2001 | Kakutani | 358/1.9 |
| 6,343,158 B1 | 1/2002 | Shiohara | |
| 6,529,643 B1 | 3/2003 | Loce et al. | |
| 6,665,448 B1 | 12/2003 | Maurer | |

(Continued)

FOREIGN PATENT DOCUMENTS

EP    1343305 A1    9/2003

(Continued)

OTHER PUBLICATIONS

Search Report issued in corresponding EP application No. 09173642.1 dated Feb. 2, 2010, which corresponds to related co-pending U.S. Appl. No. 12/604,521.

(Continued)

*Primary Examiner* — King Poon
*Assistant Examiner* — Ted Barnes
(74) *Attorney, Agent, or Firm* — Rossi, Kimms & McDowell LLP

(57) ABSTRACT

A 2-pixel averaging unit (101) halves an input image in the subscanning direction, and a multi-level error diffusion unit (102) performs multi-level error diffusion processing. A 2-pixel reconstruction unit (103) replaces each pixel with two pixels adjacent in the subscanning direction. A density value exchange unit (104) exchanges pixel values adjacent in the subscanning direction in each of 2×2 pixel blocks arranged in a checkered pattern in the image after replacement. High-density blocks each serving as a set of high-density dots and low-density blocks each serving as a set of low-density dots can be generated as 2×2 pixel blocks. The exposure region can be concentrated in PWM conversion.

8 Claims, 22 Drawing Sheets

U.S. PATENT DOCUMENTS

| | | | |
|---|---|---|---|
| 6,816,269 B1 | 11/2004 | Loce et al. | |
| 7,031,025 B1* | 4/2006 | He et al. | 358/3.09 |
| 7,064,863 B2 | 6/2006 | Fukuda et al. | |
| 7,164,502 B2* | 1/2007 | Nose et al. | 358/3.03 |
| 7,295,701 B2 | 11/2007 | Suzuki et al. | |
| 7,359,091 B2* | 4/2008 | Curry | 358/3.06 |
| 7,548,655 B2* | 6/2009 | Tatsumi et al. | 382/236 |
| 7,557,962 B2 | 7/2009 | Herron | |
| 7,627,192 B2 | 12/2009 | Yokochi | |
| 7,636,179 B2 | 12/2009 | Takahashi et al. | |
| 7,660,016 B2 | 2/2010 | Ike et al. | |
| 7,684,079 B2* | 3/2010 | Takata et al. | 358/1.9 |
| 7,684,648 B2 | 3/2010 | Miyazawa et al. | |
| 7,702,173 B2 | 4/2010 | Gao et al. | |
| 7,742,653 B2 | 6/2010 | Imai | |
| 7,826,098 B2 | 11/2010 | Suzuki | |
| 7,848,591 B2 | 12/2010 | Nakagata et al. | |
| 7,936,941 B2 | 5/2011 | Sumiya et al. | |
| 7,961,977 B2 | 6/2011 | Tanaka | |
| 8,059,910 B2 | 11/2011 | Ishiga | |
| 8,063,994 B2 | 11/2011 | Owaki et al. | |
| 8,107,772 B2 | 1/2012 | Ohkawa | |
| 8,129,990 B2 | 3/2012 | Yamamoto | |
| 8,150,198 B2 | 4/2012 | Kubo et al. | |
| 2002/0039199 A1* | 4/2002 | Nose et al. | 358/3.03 |
| 2002/0080377 A1* | 6/2002 | Tonami et al. | 358/1.9 |
| 2004/0136034 A1* | 7/2004 | Curry | 358/3.12 |
| 2006/0017978 A1* | 1/2006 | Minamino | 358/3.03 |
| 2006/0119895 A1 | 6/2006 | Takata et al. | |
| 2006/0152764 A1* | 7/2006 | Loce et al. | 358/3.06 |
| 2006/0290767 A1 | 12/2006 | Tezuka et al. | |
| 2009/0003723 A1 | 1/2009 | Kokemohr | |
| 2009/0207453 A1 | 8/2009 | Ike et al. | |

FOREIGN PATENT DOCUMENTS

| | | |
|---|---|---|
| EP | 1 736 835 A1 | 12/2006 |
| JP | 9-074488 A | 3/1997 |
| JP | 2001-309188 A | 11/2001 |
| JP | 2002-118748 A | 4/2002 |
| JP | 2002-271624 A | 9/2002 |
| JP | 2006-065834 A | 3/2006 |
| JP | 2006-159452 A | 6/2006 |

OTHER PUBLICATIONS

Search Report issued in corresponding EP application No. 09173642.1 dated Feb. 2, 2010.

Specification and drawings of unpublished U.S. Appl. No. 12/604,549, filed Oct. 23, 2009 "Image Forming Apparatus and Control Method Thereof"; Tomoyuki Saiki et al. pp. 1-59.

Specification and drawings of unpublished U.S. Appl. No. 12/604,521, filed Oct. 23, 2009 "Image Processing Apparatus and Image Processing Method"; Yuuji Takayama et al. pp. 1-40.

Floyd, Robert et al. "An Adaptive Algorithm for Spatial Grey Scale" Society for Information Display 1975 Symposium Digest of Technical Papers, pp. 36-37.

Extended European Search Report in corresponding European Patent Application No. 09173640.5 dated Jun. 25, 2010. In Related co-pending U.S. Appl. No. 12/604,549.

JP Office Action issued Jul. 13, 2012 for corresponding JP2008-274865.

JP Office Action issued Jul. 17, 2012 for related JP2008-274866.

Kappos, David, Subject Matter Eligibility of Computer Readable Media, Feb. 23, 2010, USPTO 1351 OG 212.

* cited by examiner

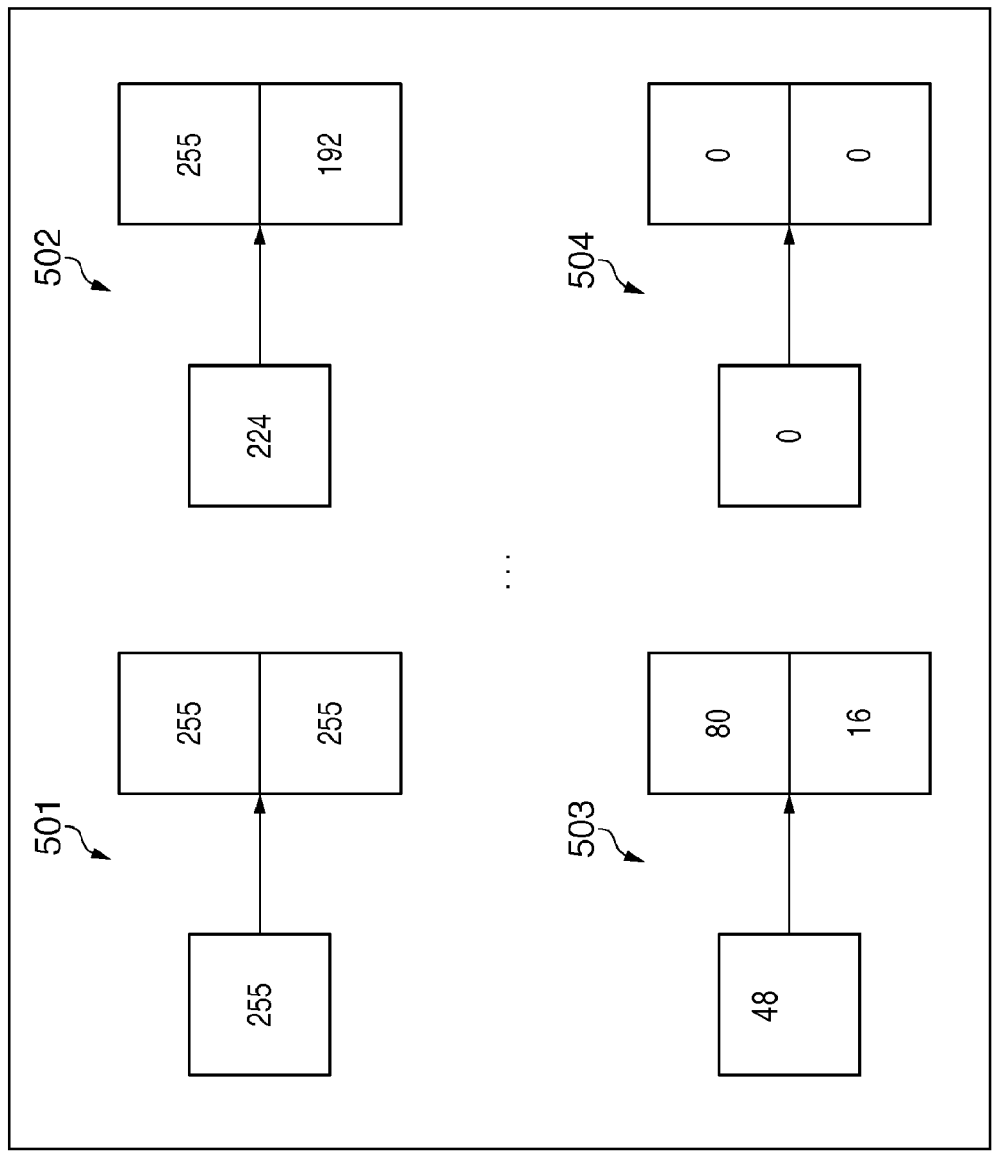

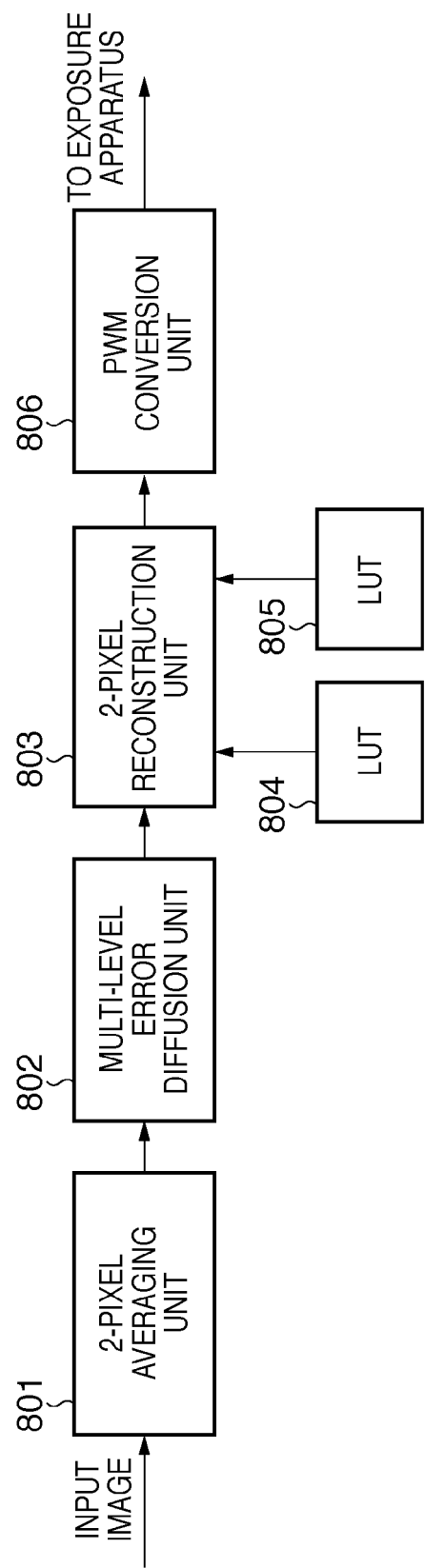

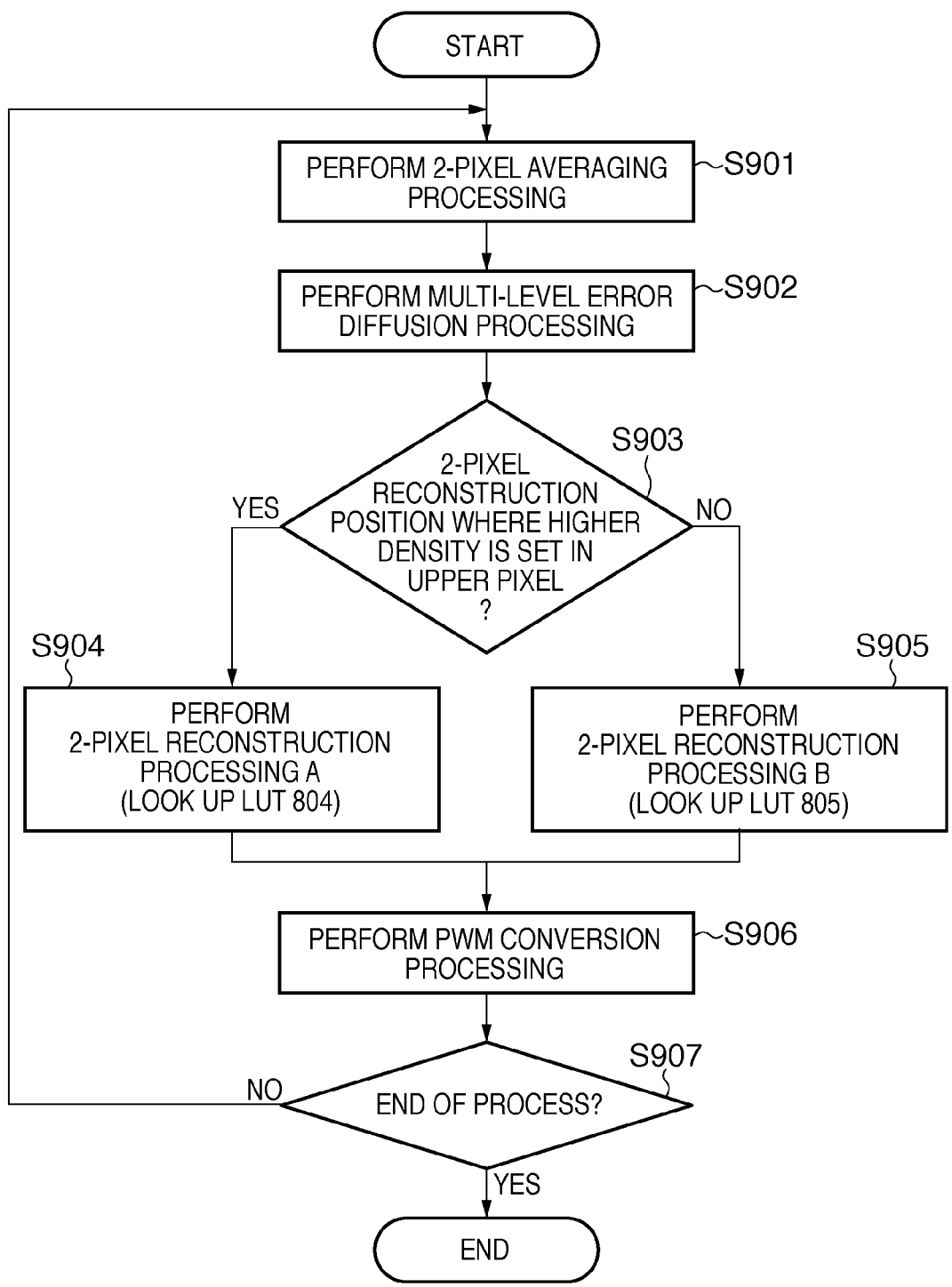

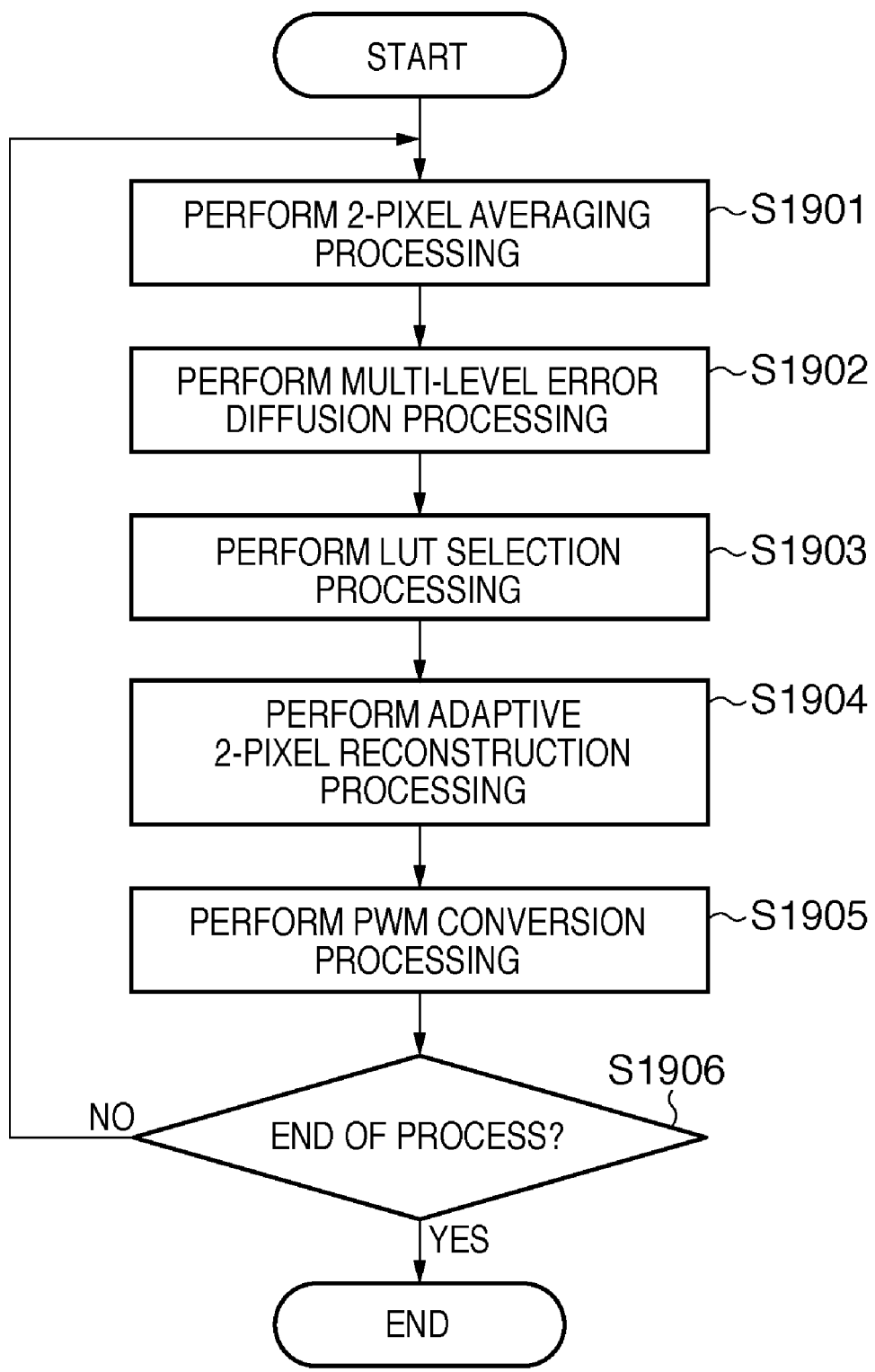

FIG. 20A
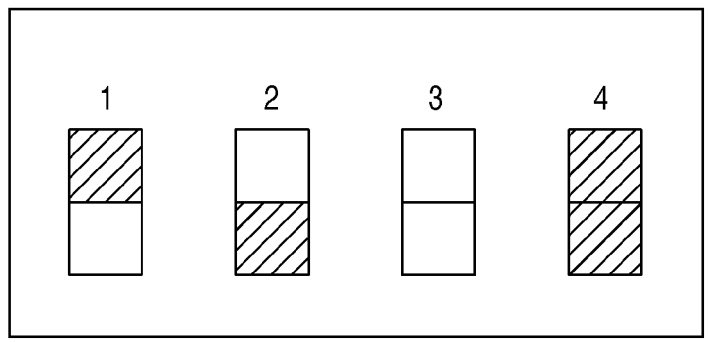
FIG. 20B
| 4 | 3 | 1 | 1 | 2 | 2 | 3 | 4 |
|---|---|---|---|---|---|---|---|
| 3 | 4 | 4 | 3 | 1 | 1 | 2 | 2 |
| 2 | 2 | 3 | 4 | 4 | 3 | 1 | 1 |
| 1 | 1 | 2 | 2 | 3 | 4 | 4 | 3 |
FIG. 20C
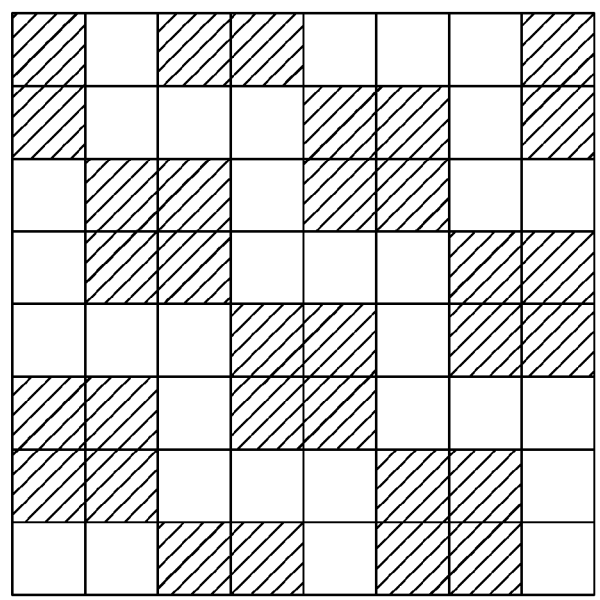

IMAGE FORMING APPARATUS AND CONTROL METHOD THEREOF

BACKGROUND OF THE INVENTION

1. Field of the Invention

The present invention relates to an image forming apparatus and control method thereof and, more particularly, to an image forming apparatus and control method thereof for applying multi-level error diffusion processing to an image forming apparatus which forms a visible image by exposure scanning and development on an image carrier and transfers it to a print medium.

2. Description of the Related Art

Pseudo halftoning has conventionally been used to represent input multi-level data by data of a smaller number of levels. Pseudo halftoning is an image processing method for representing multiple tone levels more naturally when input multi-level image data is expressed as, for example, a two-level image using only white and black dots. A representative of the pseudo halftoning is an error diffusion method (see, for example, "An Adaptive Algorithm for Spatial Gray Scale" in society for Information Display 1975 Symposium Digest of Technical Papers, 1975, p. 36). However, dot stability sometimes degrades when the error diffusion method is applied to an electrophotographic image forming apparatus such as a laser printer.

As a method for solving this problem, there is proposed pseudo halftoning of executing AM screening after FM screening to adjust the dot size and dot density (see, for example, Japanese Patent Laid-Open No. 2002-118748). This pseudo halftoning is hardly influenced by data noise (artifact) and variations in a printer.

However, pseudo halftoning by a conventional error diffusion method cannot achieve satisfactory graininess and dot stability, compared to screening.

SUMMARY OF THE INVENTION

The present invention has been made to solve the above-described problems, and provides an image forming apparatus and control method thereof that can improve graininess and dot stability when the image forming apparatus performs multi-level error diffusion processing.

According to one aspect of the present invention, there is provided an image forming apparatus which forms a visible image by exposure scanning and development on an image carrier and transfers the visible image to a print medium, the apparatus comprises: an averaging unit configured to average H pixels (H is not smaller than 2) adjacent in a subscanning direction serving as a conveyance direction of the print medium in an input image, thereby reducing a size to 1/H in the subscanning direction; a multi-level error diffusion unit configured to perform multi-level error diffusion processing for each pixel in an output image from the averaging unit; a H-pixel reconstruction unit configured to replace each pixel in an output image from the multi-level error diffusion unit with H pixels adjacent in the subscanning direction; an exchange unit configured to exchange pixel values in an output image from the H-pixel reconstruction unit; and a generator configured to generate an exposure control signal for performing the exposure scanning, based on an output image from the exchange unit.

According to another aspect of the present invention, there is provided an image forming apparatus which forms a visible image by exposure scanning and development on an image carrier and transfers the visible image to a print medium, the apparatus comprises: an averaging unit configured to average H pixels (H is not smaller than 2) adjacent in a subscanning direction serving as a conveyance direction of the print medium in an input image, thereby reducing a size to 1/H in the subscanning direction; a multi-level error diffusion unit configured to perform multi-level error diffusion processing for each pixel in an output image from the averaging unit; a H-pixel reconstruction unit configured to replace each pixel in an output image from the multi-level error diffusion unit with H pixels adjacent in the subscanning direction; and a generator configured to generate an exposure control signal for performing the exposure scanning, based on an output image from the H-pixel reconstruction unit.

According to another aspect of the present invention, there is provided a method of controlling an image forming apparatus which forms a visible image by exposure scanning and development on an image carrier and transfers the visible image to a print medium, the method comprises: an averaging step of averaging H pixels (H is not smaller than 2) adjacent in a subscanning direction serving as a conveyance direction of the print medium in an input image, thereby reducing a size to 1/H in the subscanning direction; a multi-level error diffusion step of performing multi-level error diffusion processing for each pixel in an output image from the averaging step; a H-pixel reconstruction step of replacing each pixel in an output image from the multi-level error diffusion step with H pixels adjacent in the subscanning direction; an exchange step of exchanging pixel values in an output image from the H-pixel reconstruction step; and a generation step of generating an exposure control signal for performing the exposure scanning, based on an output image from the exchange step.

According to another aspect of the present invention, there is provided a method of controlling an image forming apparatus which forms a visible image by exposure scanning and development on an image carrier and transfers the visible image to a print medium, the method comprises: an averaging step of averaging H pixels (H is not smaller than 2) adjacent in a subscanning direction serving as a conveyance direction of the print medium in an input image, thereby reducing a size to 1/H in the subscanning direction; a multi-level error diffusion step of performing multi-level error diffusion processing for each pixel in an output image from the averaging step; a H-pixel reconstruction step of replacing each pixel in an output image from the multi-level error diffusion step with H pixels adjacent in the subscanning direction; and a generation step of generating an exposure control signal for performing the exposure scanning, based on an output image from the H-pixel reconstruction step.

With this arrangement, the present invention can improve graininess and dot stability when the image forming apparatus performs multi-level error diffusion processing.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view for explaining 2-pixel reconstruction processing in the embodiment;

FIG. 8 is a block diagram showing the arrangement of an image forming apparatus in the second embodiment;

FIG. 9 is a flowchart showing image processing in the second embodiment;

FIG. 19 is a flowchart showing image processing in the sixth embodiment;

FIG. 20A is a view exemplifying a plurality of LUTs for 2-pixel reconstruction in the sixth embodiment;

FIG. 20B is a view exemplifying an LUT selection table in the sixth embodiment; and FIG. 20C is a view exemplifying an image after 2-pixel reconstruction in the sixth embodiment.

DESCRIPTION OF THE EMBODIMENTS

Preferred embodiments of the present invention will be described below. The following embodiments provide a disclosure to easily practice the invention of the present application by those skilled in the art, and are merely some of embodiments falling within the technical scope of the invention of the present application defined by the appended claims. Hence, it will readily occur to those skilled in the art that even embodiments which are not directly described in the specification of the present application will fall within the technical scope of the invention of the present application as long as the technical concept is the same as the invention.

A plurality of embodiments will be described for descriptive convenience. However, it will readily occur to those skilled in the art that these embodiments are established individually as inventions, and a proper combination of embodiments is also established as an invention.

<First Embodiment>

Printer Structure

Figure 14:
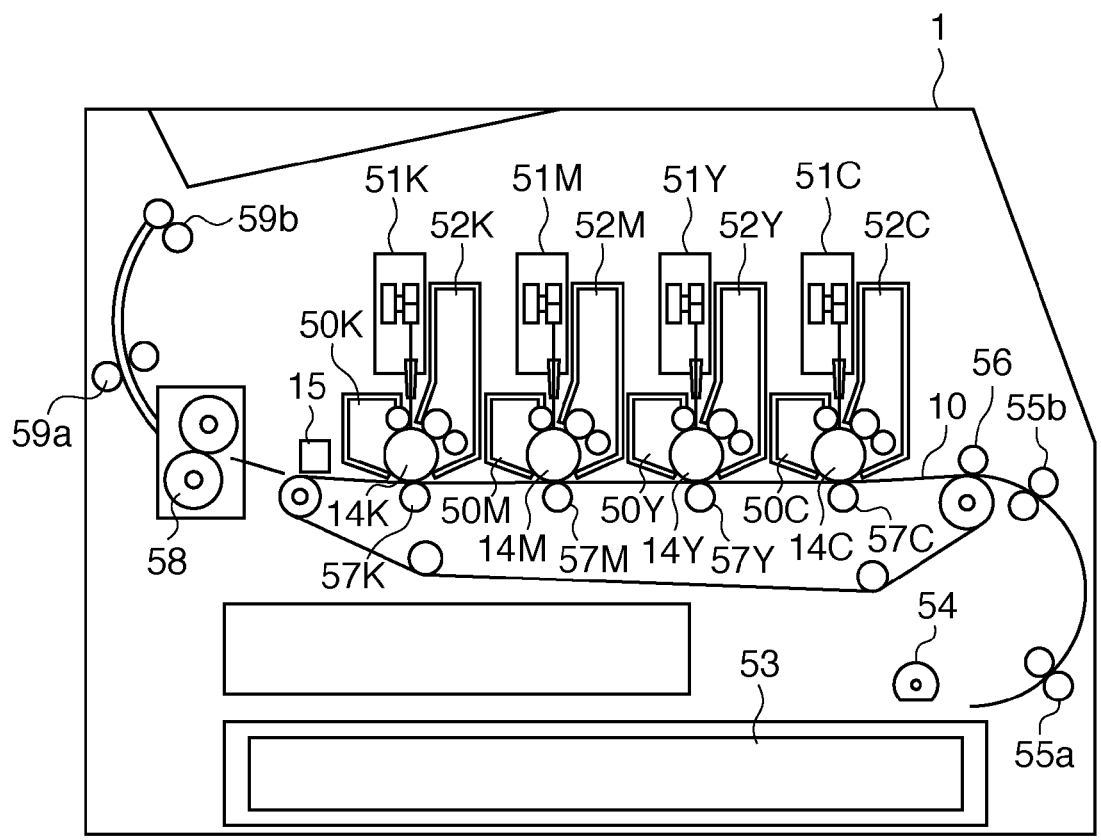
FIG. 14 is a side sectional view showing the structure of the image forming apparatus in the first embodiment.

FIG. 14 is a sectional view of the structure of an image forming apparatus in the first embodiment. As shown in FIG. 14, the image forming apparatus according to the embodiment has the structure of a 4-drum type color laser beam printer.

In the image forming apparatus, a transfer medium cassette 53 is mounted at the bottom. Print media (for example, print sheets or transparent sheets) set in the transfer medium cassette 53 are picked up one by one by a pickup roller 54, and fed to an image forming section by conveyance roller pairs 55a and 55b. In the image forming section, a transfer conveyance belt 10 for conveying a print medium is kept taut by a plurality of rotating rollers to form a flat surface in a print medium conveyance direction (from right to left in FIG. 14). On the uppermost stream side, a print medium is electrostatically attracted to the transfer conveyance belt 10. Four photosensitive drums 14C, 14Y, 14M, and 14K are aligned as drum-like image carriers to face the conveyance surface of the belt, forming an image forming section (C, Y, M, and K represent cyan, yellow, magenta, and black color components, respectively).

The image forming section forms images of the respective colors. Arrangements (to be referred to as color image forming sections) for forming an image of each color have the same structure except for the color of a stored printing material (toner). Thus, a C color image forming section for forming an image of the C color component will be explained.

The C color image forming section includes a charger 50C which uniformly charges the surface of the photosensitive drum 14C, a developing unit 52C which stores a C toner and develops an electrostatic latent image formed on the photosensitive drum 14C to visualize the image, and an exposure unit 51C. The developing unit 52C and charger 50C are arranged at a predetermined interval. A laser beam emitted by the exposure unit 51C formed from a laser scanner exposes and scans, via the interval in a direction perpendicular to the sheet surface of FIG. 14, the surface of the photosensitive drum 14C uniformly charged by the charger 50C. The exposed/scanned portion is charged differently from an unexposed portion, forming an electrostatic latent image. The developing unit 52C applies toner to the electrostatic latent image to visualize it (develop it as a toner image), forming a visible image.

A transfer unit 57C is arranged below the conveyance surface of the transfer conveyance belt 10. The toner image formed (developed) on the outer surface of the photosensitive drum 14C is attracted by charges to a conveyed print medium by a transfer field generated by the transfer unit 57C, thereby transferring the toner image onto the print medium.

The remaining Y, M, and K color image forming sections also execute the same processing as that for the C color component. As a result, C, M, Y, and K toner images are sequentially transferred onto the print medium to overlap each other. After that, a fixing unit 58 thermally fuses and fixes the respective color toners superimposed on the print medium. Discharge roller pairs 59a and 59b discharge the print medium from the apparatus.

In this example, toner images of the respective color components are directly transferred onto a print medium. However, an image forming apparatus applicable to the present invention is not limited to this arrangement. For example, it is possible that toner images of the respective color components are temporarily transferred onto the transfer conveyance belt and then the toner images transferred on the transfer conveyance belt are transferred to a print medium (secondary transfer). The transfer belt used to perform secondary transfer is called an intermediate transfer belt.

Outline of Apparatus Arrangement and Processing

Figure 1:
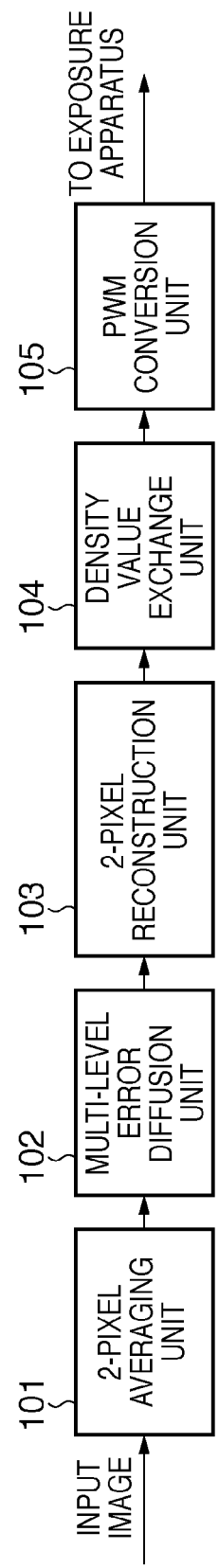
FIG. 1 is a block diagram showing the arrangement of an image forming apparatus in an embodiment.

FIG. 1 is a block diagram exemplifying an arrangement for performing image processing to generate an exposure control signal based on an input image to be formed in the image forming section in the first embodiment. The arrangement shown in FIG. 1 can be implemented by dedicated hardware or software.

In FIG. 1, reference numeral 101 denotes a 2-pixel averaging unit; 102, a multi-level error diffusion unit; 103, a 2-pixel reconstruction unit; 104, a density value exchange unit; and 105, a PWM conversion unit. These units perform processes for each color component of an input image to be formed. An outline of the operation of each unit will be explained.

The 2-pixel averaging unit 101 averages two pixels adjacent in the subscanning direction in an input image, halving the resolution in the subscanning direction. The multi-level error diffusion unit 102 quantizes (pseudo halftoning) multi-level image data input from the 2-pixel averaging unit 101 into a representative quantized value, and transfers the representative quantized value to the 2-pixel reconstruction unit 103. The 2-pixel reconstruction unit 103 returns the resolution to that of the original image by converting the representative quantized value output from the multi-level error diffusion unit 102 into the density values of the two pixels in the subscanning direction. The 2-pixel reconstruction unit 103 transfers the density values to the density value exchange unit 104. The density value exchange unit 104 generates high- and low-density blocks from the density values output from the 2-pixel reconstruction unit 103 by exchanging upper and lower values, that is, pixel values adjacent in the subscanning direction in each of 2×2 pixel blocks arranged in a checkered pattern.

The density value exchange unit 104 transfers the output after exchange to the PWM conversion unit 105. The PWM conversion unit 105 converts the received output into an exposure control signal by well-known pulse width modulation. A detailed operation of each unit will be explained.

2-Pixel Averaging Processing

Figure 3:
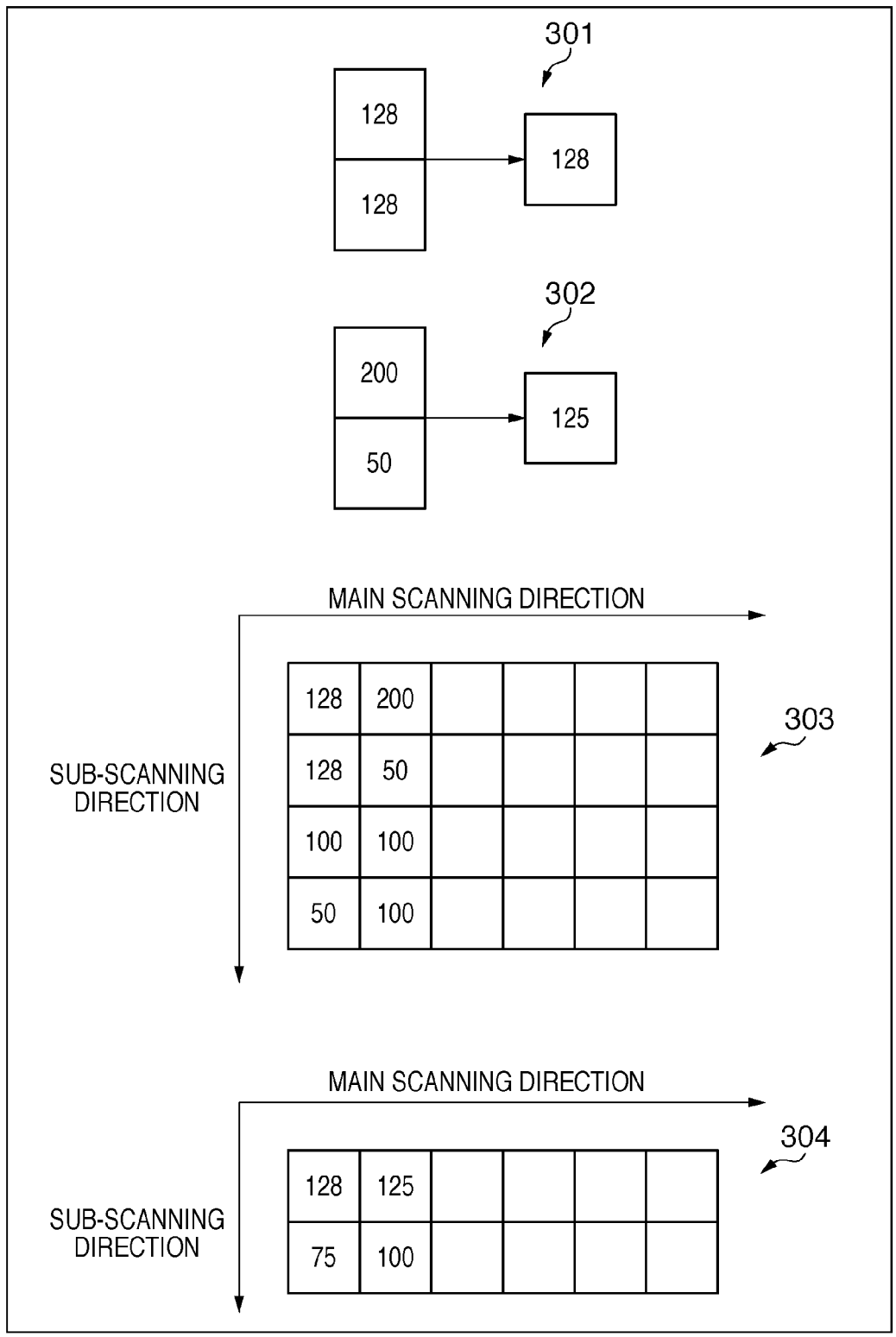
FIG. 3 is a view for explaining 2-pixel averaging processing in the embodiment.

The 2-pixel averaging unit 101 receives 255-level image data and performs 2-pixel averaging processing. FIG. 3 shows a concrete example of the 2-pixel averaging processing. In the 2-pixel averaging processing of the first embodiment, input 255-level image data is output as a value of (upper pixel value+lower pixel value)/2 in the subscanning direction, as represented by 301 and 302 in FIG. 3. The 2-pixel averaging unit 101 executes this averaging processing in the entire image region. Reference numeral 303 denotes an example of pixel values of an input image before 2-pixel averaging processing; and 304, an example of pixel values after averaging two pixels of the image represented by 303. As is apparent from FIG. 3, the 2-pixel averaging processing reduces the image size in the subscanning direction. The 2-pixel averaging unit 101 transfers the 2-pixel-averaged image to the multi-level error diffusion unit 102.

Multi-Level Error Diffusion Processing

Figure 4:
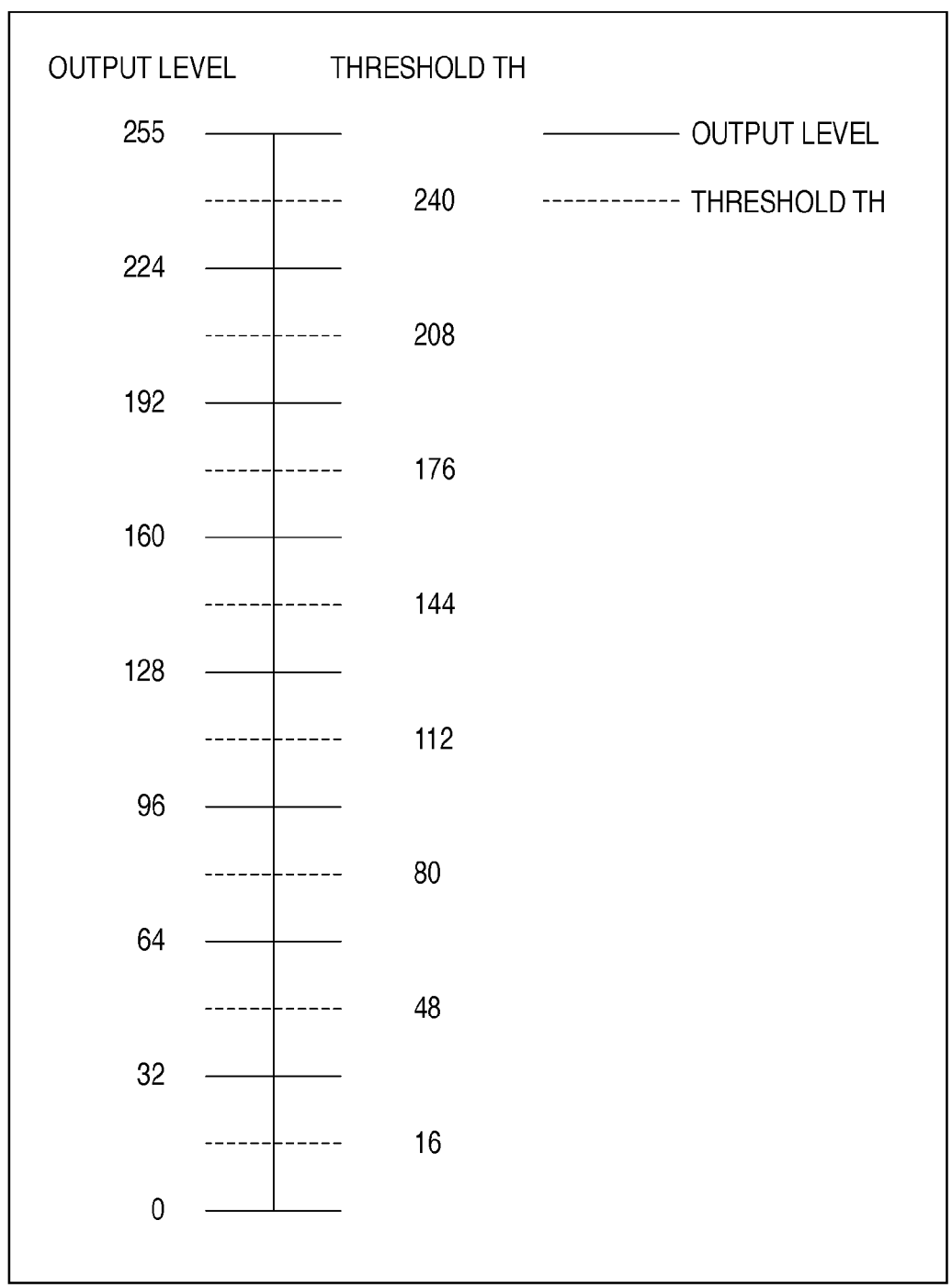
FIG. 4 is a view for explaining multi-level error diffusion processing in the embodiment.

The multi-level error diffusion unit 102 performs pseudo halftoning based on, for example, nine-level error diffusion. For example, as shown in FIG. 4, the multi-level error diffusion unit 102 determines a representative quantized value by comparing each threshold below and a value obtained by weighting a peripheral quantization error by a diffusion coefficient and adding the peripheral quantization error to a pixel value input from the 2-pixel averaging unit 101. More specifically, letting x be an input pixel value, a representative quantized value P is:

for $x<16$, $P=0$;
for $16 \leq x<48$, $P=32$;
for $48 \leq x<80$, $P=64$;
for $80 \leq x<112$, $P=96$;
for $112 \leq x<144$, $P=128$;
for $144 \leq x<176$, $P=160$;
for $176 \leq x<208$, $P=224$;
for $208 \leq x<240$, $P=240$;
for $240 \leq x$, $P=255$.

The multi-level error diffusion unit 102 diffuses, as a quantization error to unprocessed peripheral pixels, the difference between the representative quantized value and a value obtained by weighting a peripheral quantization error and adding the peripheral quantization error to an input pixel value. The diffusion coefficient used and the diffusion range are not particularly limited. The multi-level error diffusion unit 102 transfers the representative quantized value obtained by the multi-level error diffusion processing to the 2-pixel reconstruction unit 103.

2-Pixel Reconstruction Processing

The 2-pixel reconstruction unit 103 determines the output values of two pixels for each pixel of image data having undergone pseudo halftoning by the multi-level error diffusion unit 102, and converts data of one pixel into those of two pixels in the subscanning direction. The resolution (pixel count) of an input image has been halved in the subscanning direction by the above-described 2-pixel averaging processing of the 2-pixel averaging unit 101. Thus, the 2-pixel reconstruction unit 103 restores the resolution (pixel count) of the input image by 2-pixel reconstruction processing. FIG. 5 shows a concrete example of the 2-pixel reconstruction processing. An input pixel value is restricted by the foregoing quantization of the multi-level error diffusion unit 102. In the first embodiment, a pair of pixels values of two pixels to be output is set in advance for each input pixel value. For example, two pixels output "255" for an input value "255", as represented by 501 in FIG. 5. As represented by 502, one pixel outputs "255" and the other outputs "192" for an input value "224". As represented by 503, one pixel outputs "80" and the other outputs "16" for an input value "48". As represented by 504, two pixels output "0" for an input value "0".

In this way, the 2-pixel reconstruction processing of the first embodiment has a feature of setting a difference between two output pixel values for each input pixel value except a maximum value (255) and minimum value (0). More specifically, pairs of pixel values to be replaced include the first pair in which the pixel values of two pixels are different from each other and the second pair in which those of two pixels are equal to each other. The second pair corresponds to maximum and minimum input pixel values.

As the difference between pixel values of each pair, the magnitude relationship is fixed such that a large value is assigned to one pixel on the upper side in the subscanning direction and a small value is assigned to the other on the lower side in replacement, or vice versa. That is, in the first pair, the pixel value of a pixel on one side in the subscanning direction in replacement is larger than that of a pixel on the other side. The set difference suffices to be determined based on an actual image forming state.

Assignment of a pair of pixel values to be replaced by the 2-pixel reconstruction unit 103 is implemented by a variety of methods, and is not particularly limited in the embodiment.

For example, the values of two pixels (that is, a pair of pixel values) in the subscanning direction may be held in an LUT. It is also possible to hold the value of one of two pixels in an LUT and calculate that of the other according to an equation. The pixel values of two pixels may be determined by a predetermined calculation such that the output value of multi-level error diffusion processing is multiplied by a predetermined ratio. A pair of pixel values may change depending on the color plane.

The 2-pixel reconstruction unit 103 transfers the output having undergone the 2-pixel reconstruction processing to the density value exchange unit 104.

Density Value Exchange Processing

Figure 6A:
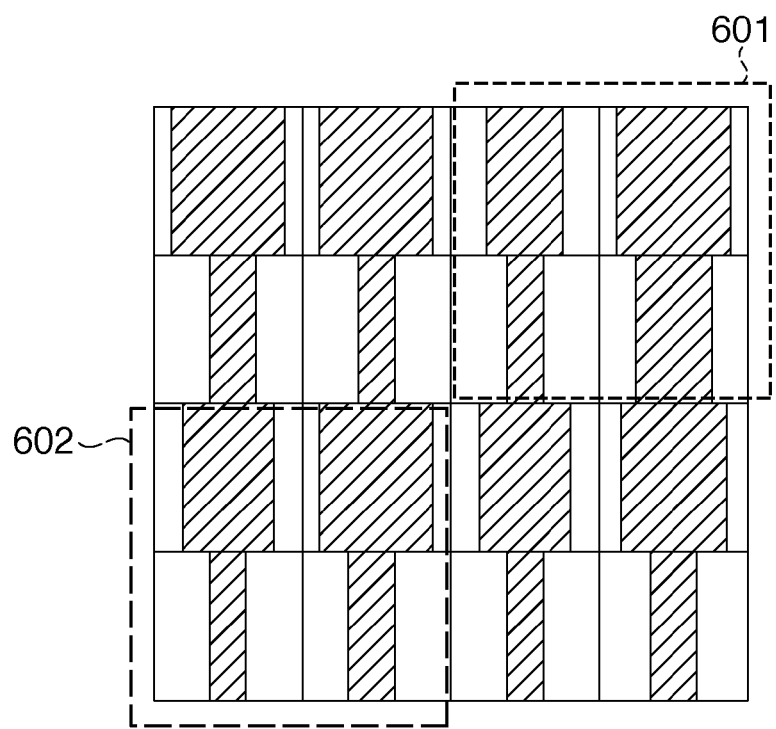
FIG. 6A is a view exemplifying an image before density value exchange in the embodiment.

A concrete processing of the density value exchange unit 104 will be explained with reference to FIGS. 6A and 6B. FIG. 6A shows an output example of the 2-pixel reconstruction unit 103. In FIG. 6A, the density value of each pixel is indicated by the width of a hatched portion in the main scanning direction. In FIG. 6A, high- and low-density lines appear alternately in the subscanning direction upon the above-described 2-pixel reconstruction processing.

The density value exchange unit 104 exchanges the densities of upper and lower pixels (subscanning direction) in each of blocks arranged alternately in a checkered pattern in both the main scanning direction and subscanning direction when the entire image shown in FIG. 6A is divided into 2×2 pixel blocks. In the example shown in FIG. 6A, densities are exchanged in pixel blocks 601 and 602 (to be referred to as exchange blocks). Accordingly, the pixel blocks 601 and 602 are converted into pixel blocks 603 and 604 shown in FIG. 6B, respectively.

Figure 6B:
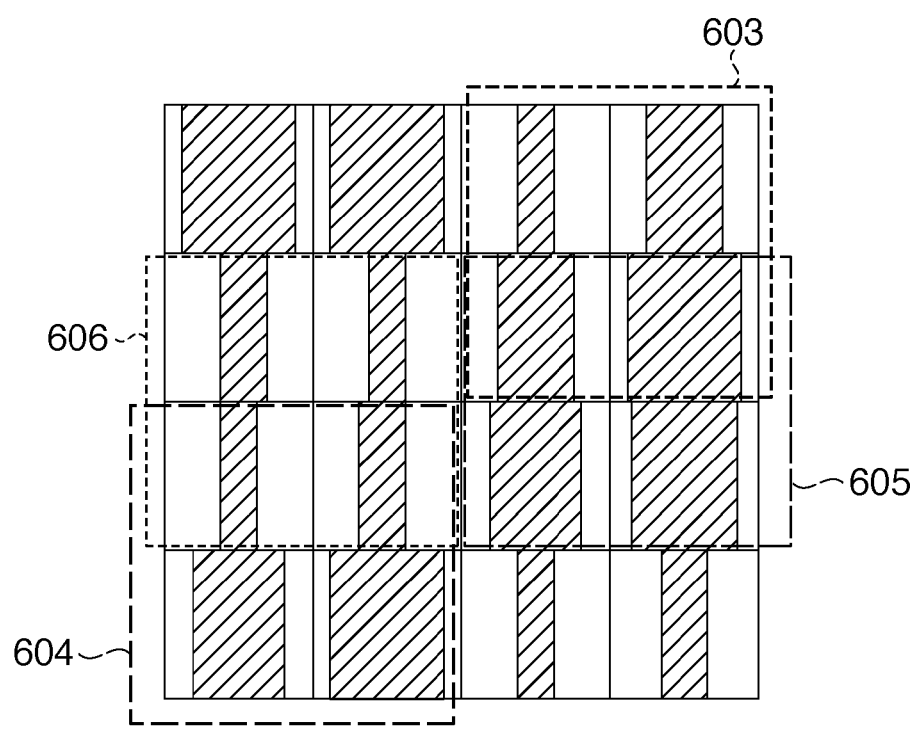
FIG. 6B is a view exemplifying an image after density value exchange in the embodiment.

In the image after exchange shown in FIG. 6B, high-density blocks (for example, a high-density block 605 in FIG. 6B) each serving as a set of high-density dots and low-density blocks (for example, a low-density block 606 in FIG. 6B) each serving as a set of low-density dots are generated as 2×2 pixel blocks.

The density value exchange unit 104 transfers the output to the PWM conversion unit 105.

PWM Conversion Processing

Figure 7A:
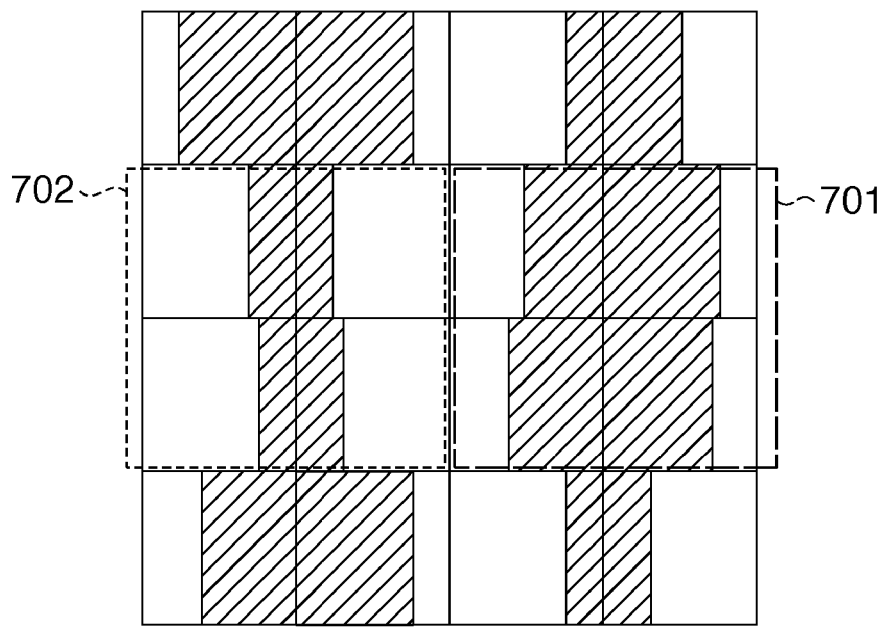
FIG. 7A is a view exemplifying a PWM signal in the embodiment.

Concrete processing of the PWM conversion unit 105 will be explained with reference to FIGS. 7A and 7B. The PWM conversion unit 105 performs pulse width modulation (PWM) for the density value-exchanged image shown in FIG. 6B to convert the image into an exposure signal (PWM signal) to the photosensitive member in each color image forming section. FIG. 7A exemplifies the exposure signal (PWM signal) after PWM conversion. In FIG. 7A, a block 701 corresponds to the high-density block 605 in FIG. 6B, and a block 702 corresponds to the low-density block 606. In the PWM conversion processing of the first embodiment, the growth direction is controlled so that a dot is grown from right in an odd-numbered pixel in the main scanning direction and left in an even-numbered pixel, shown in FIG. 7A. For this reason, a PWM signal is generated to concentrate at the center in the main scanning direction in each of 2×2 pixel blocks shown in FIG. 7A.

Figure 7B:
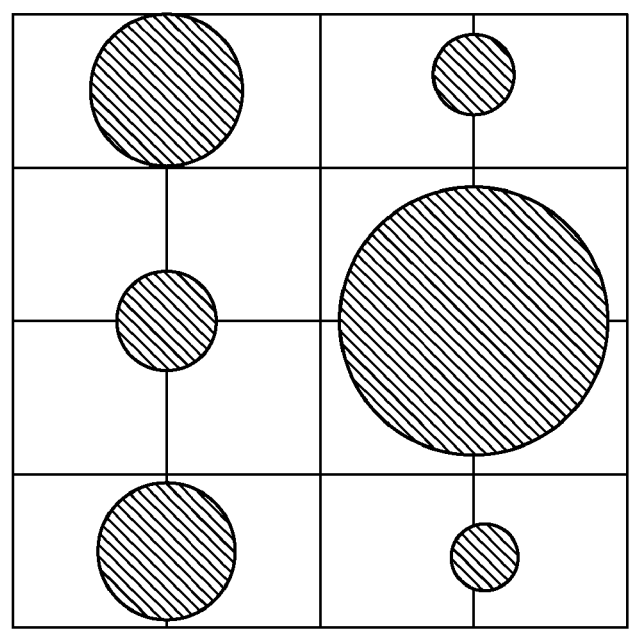
FIG. 7B is a view exemplifying a dot formed by a PWM signal in the embodiment.

FIG. 7B shows a dot output image in actual exposure scanning in accordance with the PWM signals shown in FIG. 7A. As is apparent from FIG. 7B, PWM control in the first embodiment can concentrate the exposure region, achieving stable dot reproduction.

Sequence of Processing

Figure 2:
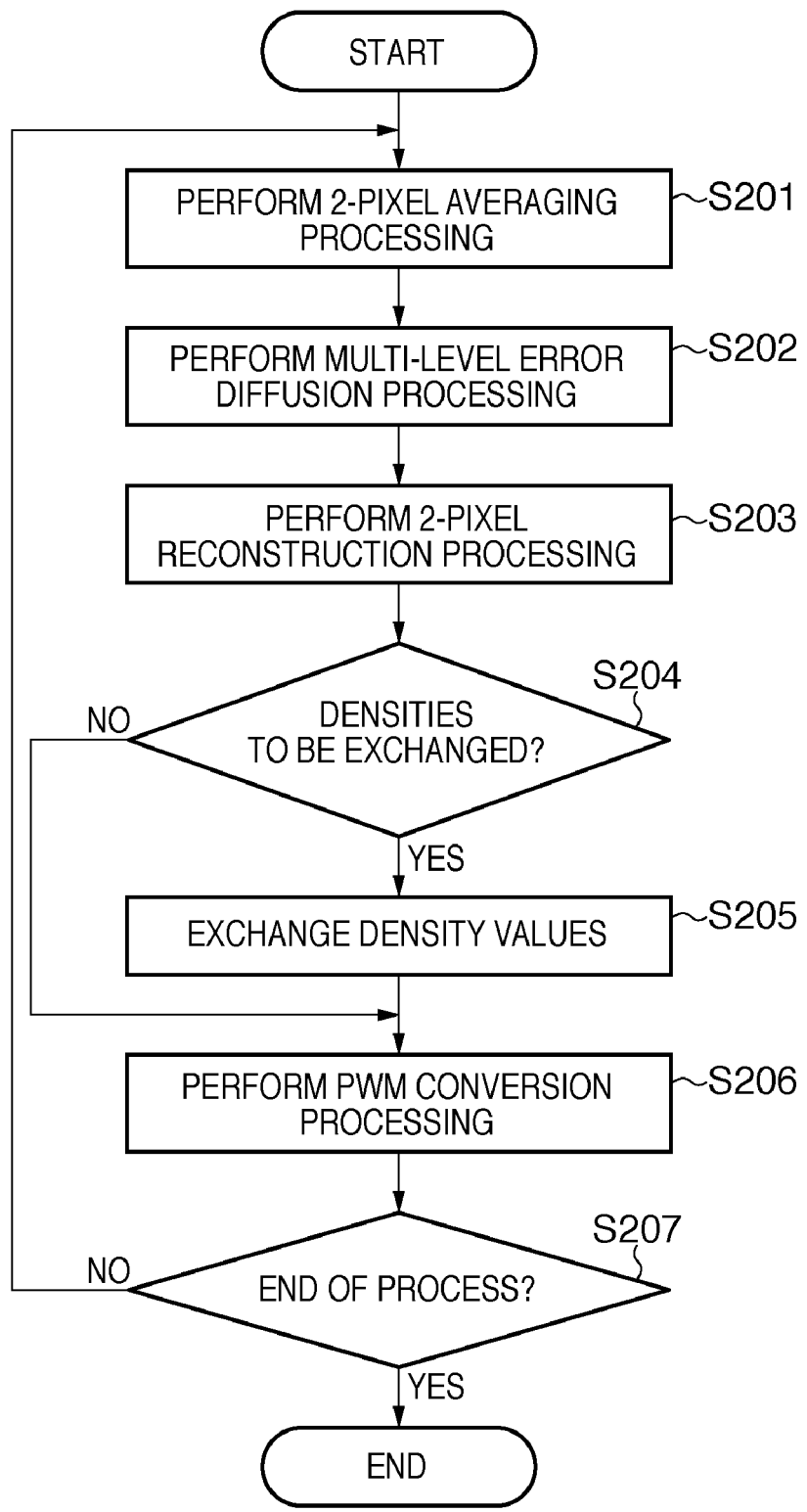
FIG. 2 is a flowchart showing image processing in the embodiment.

The sequence of image processing in the first embodiment will be explained with reference to the flowchart of FIG. 2.

In step S201, 2-pixel averaging processing is done. In step S202, multi-level error diffusion processing is performed for the image having undergone the 2-pixel averaging processing. In step S203, 2-pixel reconstruction processing is executed for the image having undergone the multi-level error diffusion processing. In step S204, it is determined whether to perform density value exchange processing for the image having undergone the 2-pixel reconstruction processing. This determination is made depending on whether a currently processed pixel belongs to an exchange block shown in FIG. 6A. If it is determined to perform density exchange processing, the density exchange processing is done in step S205 for the image having undergone the 2-pixel reconstruction processing. Then, the process advances to step S206. If it is determined not to perform density exchange processing, the process directly advances to step S206.

In step S206, the image having undergone the density value exchange processing is converted into an exposure signal (PWM signal) by PWM conversion processing. The exposure signal is output to the exposure unit 51C, an exposure unit 51M, an exposure unit 51Y, or an exposure unit 51K which corresponds to the current processing plane. Upon completion of the series of processes, it is determined in step S207 whether the entire input image has been processed. If it is determined that unprocessed input image data remains, the process returns to step S201 to repeat the series of processes.

In the first embodiment, input pixels are pipeline-processed. However, the processing unit in the present invention is not limited to this example, and the respective processes may be executed for each page or a plurality of lines (bands).

As described above, according to the first embodiment, multi-level error diffusion is performed after averaging two pixels. When the resolution is restored to an original one after reconstructing the two pixels, a difference is set between the density values of the two pixels. Further, the density values are exchanged depending on the position. PWM conversion can be executed to concentrate the exposure region on the printer engine, suppressing interference such as moiré in pseudo halftoning and improving graininess and dot stability. In addition, the processing speed can increase because the pixel count in multi-level error diffusion is halved.

The processes in the first embodiment do not depend on the number of quantization levels in multi-level error diffusion processing. Thus, the multi-level error diffusion processing is not limited to nine-level error diffusion processing exemplified in the first embodiment, and can be easily expanded to N-level error diffusion processing.

The first embodiment has exemplified a color laser beam printer. However, the present invention is not limited to this example, and is applicable to any electrophotographic apparatus such as an LED printer, copying machine, or facsimile apparatus.

<Second Embodiment>

The second embodiment according to the present invention will be described. The second embodiment is also practiced using a 4-drum type color laser beam printer having a structure as shown in FIG. 14 in the first embodiment.

FIG. 8 is a block diagram exemplifying an arrangement for performing image processing to generate an exposure control signal based on an input image to be formed in an image forming section according to the second embodiment. The arrangement shown in FIG. 8 can be implemented by dedicated hardware or software.

In FIG. 8, reference numeral 801 denotes a 2-pixel averaging unit; 802, a multi-level error diffusion unit; 803, a 2-pixel reconstruction unit; and 806, a PWM conversion unit. The 2-pixel reconstruction unit 803 includes two LUTs 804 and 805, in place of the density value exchange unit 104 in the first embodiment. Only an arrangement different from the image forming section of the first embodiment will be explained.

The 2-pixel reconstruction unit 803 looks up either of the two LUTs 804 and 805 when converting the representative quantized value of one pixel output from the multi-level error diffusion unit 802 into the density values of two, upper and lower pixels in the subscanning direction. Each of the LUTs 804 and 805 holds a plurality of pairs each including the density values of two, upper and lower pixels to be output in response to an input representative quantized value of one pixel. For example, when the multi-level error diffusion unit 802 performs nine-level error diffusion processing, the LUTs 804 and 805 hold the following values. For example, the LUT 804 holds nine pairs in each of which a larger density value is assigned to an upper pixel in the subscanning direction. The LUT 805 holds nine pairs in each of which a larger density value is assigned to a lower pixel in the subscanning direction. In this case, the LUTs 804 and 805 hold a total of 18 conversion values for 2-pixel reconstruction processing. It is also possible that the LUT 804 holds a value for setting a higher density in a lower pixel and the LUT 805 holds a value for setting a higher density in an upper pixel. The LUTs 804 and 805 can be configured as one LUT.

In the second embodiment, the LUT looked up to reconstruct two pixels of an input image by the 2-pixel reconstruction unit 803 is switched for every two pixels in the main scanning direction and every pixel in the subscanning direction. Accordingly, the second embodiment omits density value exchange processing in the first embodiment.

The following control is possible especially when the LUTs 804 and 805 are stored in one RAM. More specifically, a value obtained by XORing data of the second bit from the LSB of a main scanning counter X and that of the first bit from the LSB of a subscanning counter Y is used as one bit of the address line of the RAM which stores the LUTs. By only this setting, an output pixel value after density value exchange can be attained.

FIG. 9 shows the sequence of image processing in the second embodiment. In the second embodiment, the image processing shown in FIG. 9 is done for all the planes of input image data.

In steps S901 and S902, 2-pixel averaging processing and multi-level error diffusion processing are performed, similar to the first embodiment described above.

In step S903, it is determined which of 2-pixel reconstruction processing A and 2-pixel reconstruction processing B is done for the output image having undergone the multi-level error diffusion processing. This determination suffices to switch the LUT for every two pixels in the main scanning direction and every pixel in the subscanning direction. The LUT is switched as follows depending on which of odd and even numbers is indicated by the subscanning address y, and the position of the main scanning address x.

For example, when the subscanning address y is an odd number, if the remainder of division of the main scanning address x by 4 is 0 or 1, 2-pixel reconstruction processing A using the LUT 804 is performed in step S904 to set a high density in an upper pixel in the subscanning direction in 2-pixel reconstruction. If the remainder is 2 or 3, 2-pixel reconstruction processing B using the LUT 805 is performed in step S905 to set a high density in a lower pixel in the subscanning direction in 2-pixel reconstruction. To the contrary, when the subscanning address y is an even number, if the remainder of division of the main scanning address x by 4 is 0 or 1, 2-pixel reconstruction processing B using the LUT 805 is performed in step S905. If the remainder is 2 or 3, 2-pixel reconstruction processing A using the LUT 804 is performed in step S904.

Consequently, high- and low-density blocks are generated as 2×2 pixel blocks in a checkered pattern, similar to density value exchange processing executed in the first embodiment. As described above, combinations of the determination result and 2-pixel reconstruction processing to be selected are not limited to the above-mentioned example, and may be reversed.

In step S906, the output data having undergone 2-pixel reconstruction processing in either step S904 or S905 is converted into an exposure PWM signal, and the PWM signal is output to the printer engine. Upon completion of the series of processes, it is determined in step S907 whether to continue the series of processes. If it is determined to continue the series of processes, the process returns to step S901 to repeat it.

As described above, according to the second embodiment, the LUT looked up in 2-pixel reconstruction processing is switched based on the main scanning position of a pixel after quantization. The second embodiment can therefore obtain the same effects as those of the first embodiment.

<Third Embodiment>

The third embodiment according to the present invention will be described. The third embodiment is also practiced using a 4-drum type color laser beam printer having a structure as shown in FIG. 14 in the first embodiment.

Figure 10:
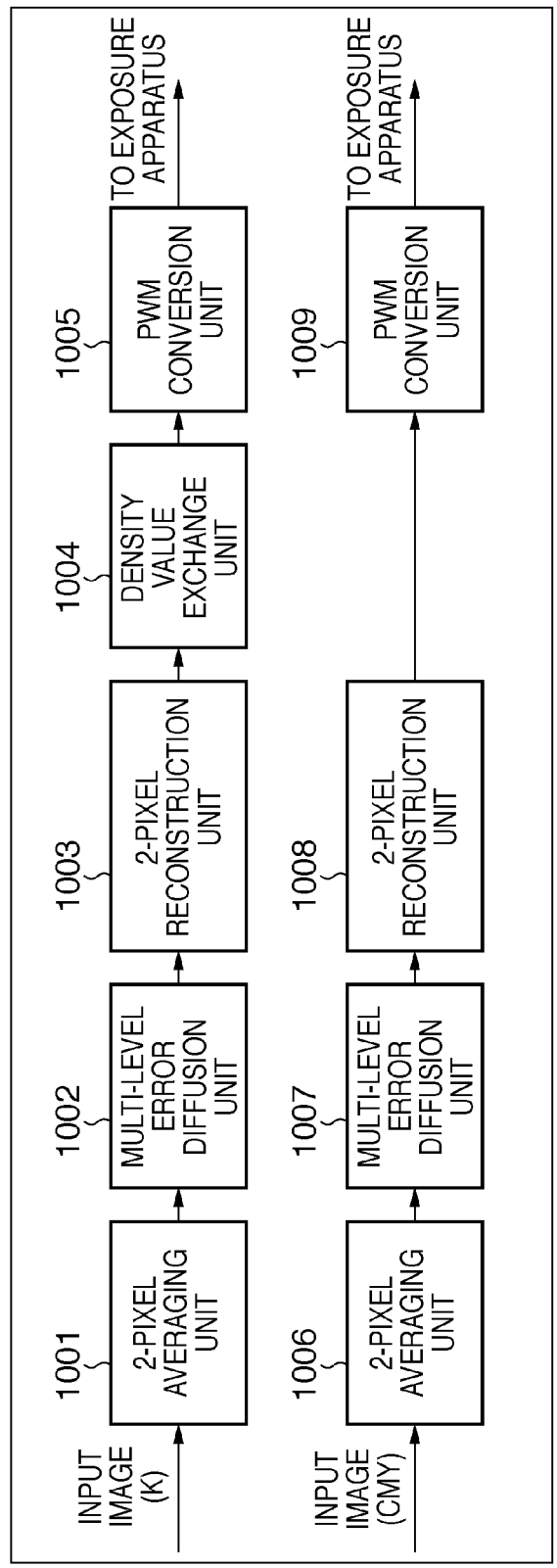
FIG. 10 is a block diagram showing the arrangement of an image forming apparatus in the third embodiment.

FIG. 10 is a block diagram exemplifying an arrangement for performing image processing to generate an exposure control signal based on an input image to be formed in an image forming section according to the third embodiment. The arrangement shown in FIG. 10 can be implemented by dedicated hardware or software.

In FIG. 10, a 2-pixel averaging unit 1001, multi-level error diffusion unit 1002, 2-pixel reconstruction unit 1003, density value exchange unit 1004, and PWM conversion unit 1005 are arranged for the K plane of an input image. A 2-pixel averaging unit 1006, multi-level error diffusion unit 1007, 2-pixel reconstruction unit 1008, and PWM conversion unit 1009 are arranged for the C, M, and Y planes of an input image. That is, in the third embodiment, the processing units differ between the K plane and the remaining C, M, and Y planes of an input image. The third embodiment omits a density value exchange unit for the C, M, and Y planes.

In general, graininess of K color stands out much more than those of the remaining colors. From this, the third embodiment defines the K plane as a specific plane, and executes processing to further improve graininess by the arrangement described in the first embodiment. As for the C, M, and Y planes other than the specific plane, no density value exchange processing is done by setting the difference between the density values of two pixels output from the 2-pixel reconstruction unit 1008 to be smaller than that between density values from the 2-pixel reconstruction unit 1003 for the K plane. This arrangement can improve graininess of K color that stands out, reduce the processing load for the remaining colors, and execute high-speed pseudo halftoning. This arrangement can also suppress generation of color moiré caused by a relative deviation (misregistration) between the planes.

Figure 11:
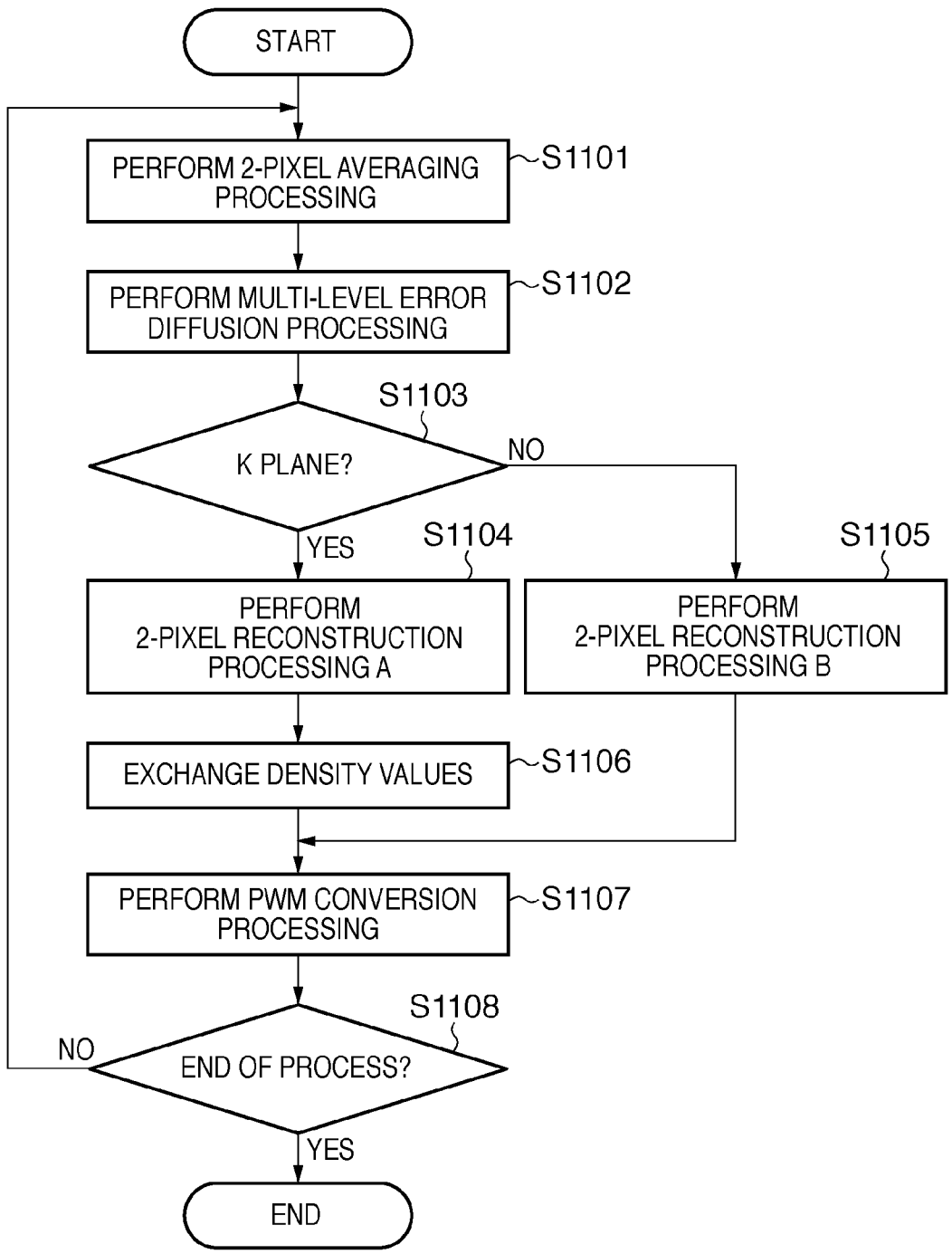
FIG. 11 is a flowchart showing image processing in the third embodiment.

FIG. 11 shows the sequence of image processing in the third embodiment. In the third embodiment, the image processing shown in FIG. 11 is done for all the planes of input image data.

In steps S1101 and S1102, 2-pixel averaging processing and multi-level error diffusion processing are performed, similar to the first embodiment described above.

If the plane of the image having undergone the multi-level error diffusion processing is K in step S1103, the same 2-pixel reconstruction processing (2-pixel reconstruction processing A) as that in the first embodiment is executed in step S1104. In step S1106, the same density value exchange processing as that in the first embodiment is done.

If the plane of the image having undergone the multi-level error diffusion processing is C, M, or Y other than K, 2-pixel reconstruction processing B is done in step S1105. In pixel reconstruction processing B, the difference between two pixels to be replaced is controlled to be smaller than that in 2-pixel reconstruction processing A in step S1004. That is, pixel reconstruction processing A and pixel reconstruction processing B are set in advance so that the difference between two pixels satisfies this condition in a pair of pixel values to be replaced.

In step S1107, the output data having undergone the density value exchange processing in step S1106 or 2-pixel reconstruction processing B in step S1105 is converted into an exposure PWM signal, and the PWM signal is output to the printer engine. Upon completion of the series of processes, it is determined in step S1108 whether to continue the series of processes. If it is determined to continue the series of processes, the process returns to step S1101 to repeat it.

In the third embodiment, all the processing units differ between the K plane and the C, M, and Y planes. Alternatively, units which perform the same processes for the respective plans, such as the 2-pixel averaging unit, multi-level error diffusion unit, and PWM conversion unit, may be shared. In this case, the 2-pixel reconstruction unit 1003 serving as the first 2-pixel reconstruction unit, the 2-pixel reconstruction unit 1008 serving as the second 2-pixel reconstruction unit, and the density value exchange unit 1004 are used in accordance with the color planes, but the remaining units are shared. The 2-pixel reconstruction unit may also be shared to switch processing within it in accordance with the plane.

In the third embodiment, an input image has C, M, Y, and K planes, and density exchange processing is performed for only the K plane. However, the present invention is not limited to this example. Even for image data made up of other components, density value exchange processing may be executed for only a specific plane or a combination of planes in which graininess particularly stands out.

As described above, according to the third embodiment, density value exchange processing is done for only the K plane whose graininess stands out. While improving graininess similarly to the first embodiment, the third embodiment can achieve high-speed processing for the remaining color planes.

<Fourth Embodiment>

The fourth embodiment according to the present invention will be described. The fourth embodiment is also practiced using a 4-drum type color laser beam printer having a structure as shown in FIG. 14 in the first embodiment.

Figure 12:
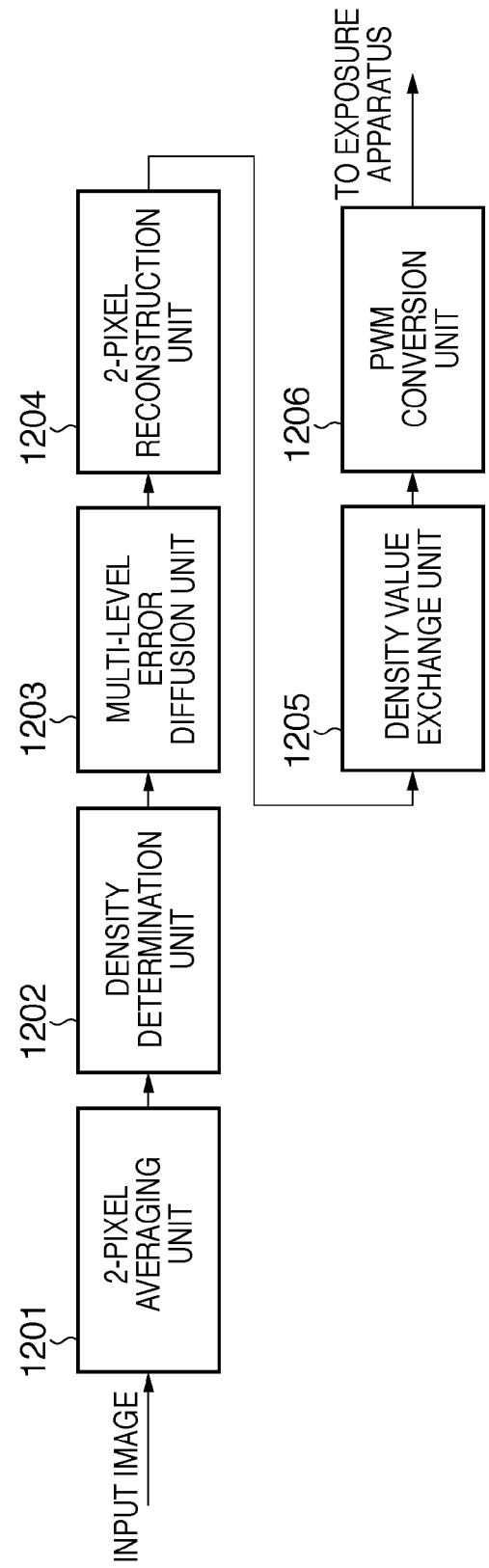
FIG. 12 is a block diagram showing the arrangement of an image forming apparatus in the fourth embodiment.

FIG. 12 is a block diagram exemplifying an arrangement for performing image processing to generate an exposure control signal based on an input image to be formed in an image forming section according to the fourth embodiment. The arrangement shown in FIG. 12 can be implemented by dedicated hardware or software.

In FIG. 12, reference numeral 1201 denotes a 2-pixel averaging unit; 1202, a density determination unit; 1203, a multi-level error diffusion unit; 1204, a 2-pixel reconstruction unit; 1205, a density value exchange unit; and 1206, a PWM conversion unit. As a feature of the fourth embodiment, the density determination unit 1202 is arranged. Only an arrangement different from the image forming section of the first embodiment will be explained. In the fourth embodiment, the density determination unit 1202 switches processing based on the density value of an input image. For example, image data which can take 256 tone levels of 0 to 255 is input. If the value falls within a range of 128 to 255, it is controlled to decrease the difference (density difference) between two pixels output from the 2-pixel reconstruction unit 1204 so as not to perform density value exchange processing by the density value exchange unit 1205. If the value falls within a range of 0 to 127, it is controlled to increase the density difference between two pixels output from the 2-pixel reconstruction unit 1204 and perform density value exchange processing by the density value exchange unit 1205. Similar to the first embodiment, the fourth embodiment can improve graininess at a highlight portion (high-density portion) where graininess stands out.

In this fashion, according to the fourth embodiment, processes by the 2-pixel reconstruction unit 1204 and density value exchange unit 1205 are switched based on the determination result of a density value by the density determination unit 1202. The switching is controlled by, for example, setting a predetermined flag in accordance with the density determination result.

Figure 13:
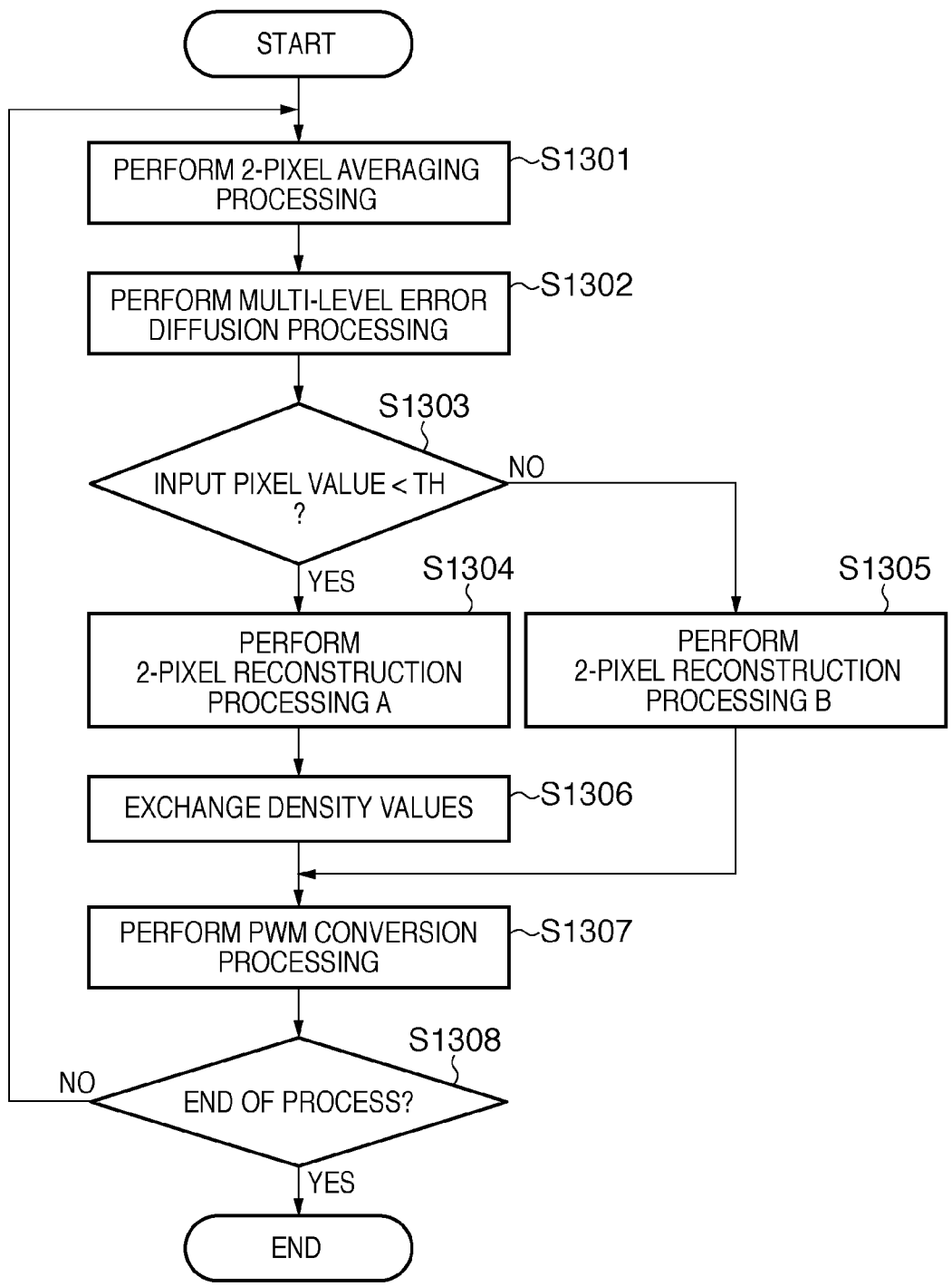
FIG. 13 is a flowchart showing image processing in the fourth embodiment.

FIG. 13 shows the sequence of image processing in the fourth embodiment. In the fourth embodiment, the image processing shown in FIG. 13 is done for all the planes of input image data.

In steps S1301 and S1302, 2-pixel averaging processing and multi-level error diffusion processing are performed, similar to the first embodiment described above.

In step S1303, the pixel value after multi-level error diffusion is compared with a preset threshold TH (TH=128 in the foregoing example). If the pixel value is smaller than the threshold TH, 2-pixel reconstruction processing A is done for the above-mentioned high-density portion in step S1304. In step S1306, the same density value exchange processing as that in the first embodiment is executed. If the pixel value is equal to or larger than the threshold TH, 2-pixel reconstruction processing B is done for the above-mentioned low-density portion in step S1305.

In step S1307, the output data having undergone the density value exchange processing in step S1306 or 2-pixel reconstruction processing B in step S1305 is converted into an exposure PWM signal, and the PWM signal is output to the printer engine. Upon completion of the series of processes, it is determined in step S1308 whether to continue the series of processes. If it is determined to continue the series of processes, the process returns to step S1301 to repeat it.

As described above, according to the fourth embodiment, 2-pixel reconstruction processing and density value exchange processing are done in accordance with the density value of an input image. While improving graininess especially for a low-density portion similarly to the first embodiment, the fourth embodiment implements high-speed processing for a high-density portion.

In this description, the 2-pixel reconstruction processing method is switched depending on the input value. However, the present invention is not limited to this, and two 2-pixel reconstruction processes may be performed simultaneously to blend outputs from the two 2-pixel reconstruction processes into an output density value. In this case, the blending ratio of outputs from the two 2-pixel reconstruction processes may be changed in accordance with the input density value. This arrangement gradually switches the density difference between two output pixels in accordance with the input density, so the switching portion is less conspicuous. Also, three or more 2-pixel reconstruction processing methods may be switched by setting a plurality of thresholds.

<Fifth Embodiment>

The fifth embodiment according to the present invention will be described. The fifth embodiment is also practiced using a 4-drum type color laser beam printer having a structure as shown in FIG. 14 in the first embodiment.

Figure 15:
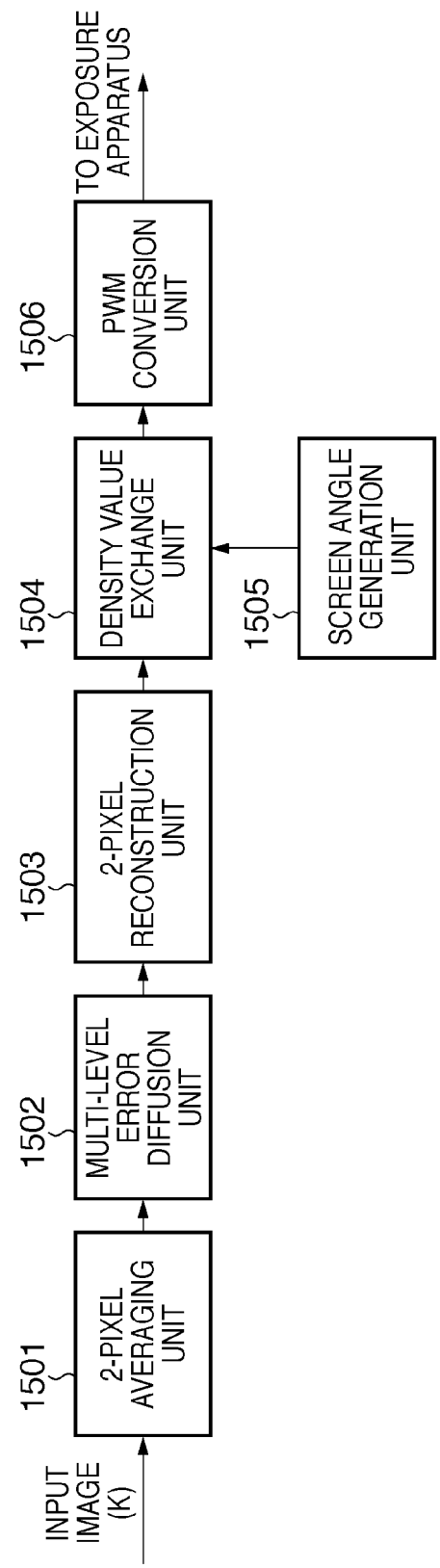
FIG. 15 is a block diagram showing the arrangement of an image forming apparatus in the fifth embodiment.

FIG. 15 is a block diagram exemplifying an arrangement for performing image processing to generate an exposure control signal based on an input image to be formed in an image forming section according to the fifth embodiment. The arrangement shown in FIG. 15 can be implemented by dedicated hardware or software.

In FIG. 15, reference numeral 1501 denotes a 2-pixel averaging unit; 1502, a multi-level error diffusion unit; 1503, a 2-pixel reconstruction unit; 1504, a density value exchange unit; 1505, a screen angle generation unit; and 1506, a PWM conversion unit. As a feature of the fifth embodiment, the screen angle generation unit 1505 is arranged. Only an arrangement different from the image forming section of the first embodiment will be explained.

In the fifth embodiment, the screen angle generation unit 1505 exchanges density values to give a screen angle to an output image. Further, the screen angle generation unit 1505 changes a generated screen for each plane of an input image. With the screen angle generation unit 1505, the fifth embodiment can improve graininess similarly to the first embodiment while suppressing color moiré.

Figure 16:
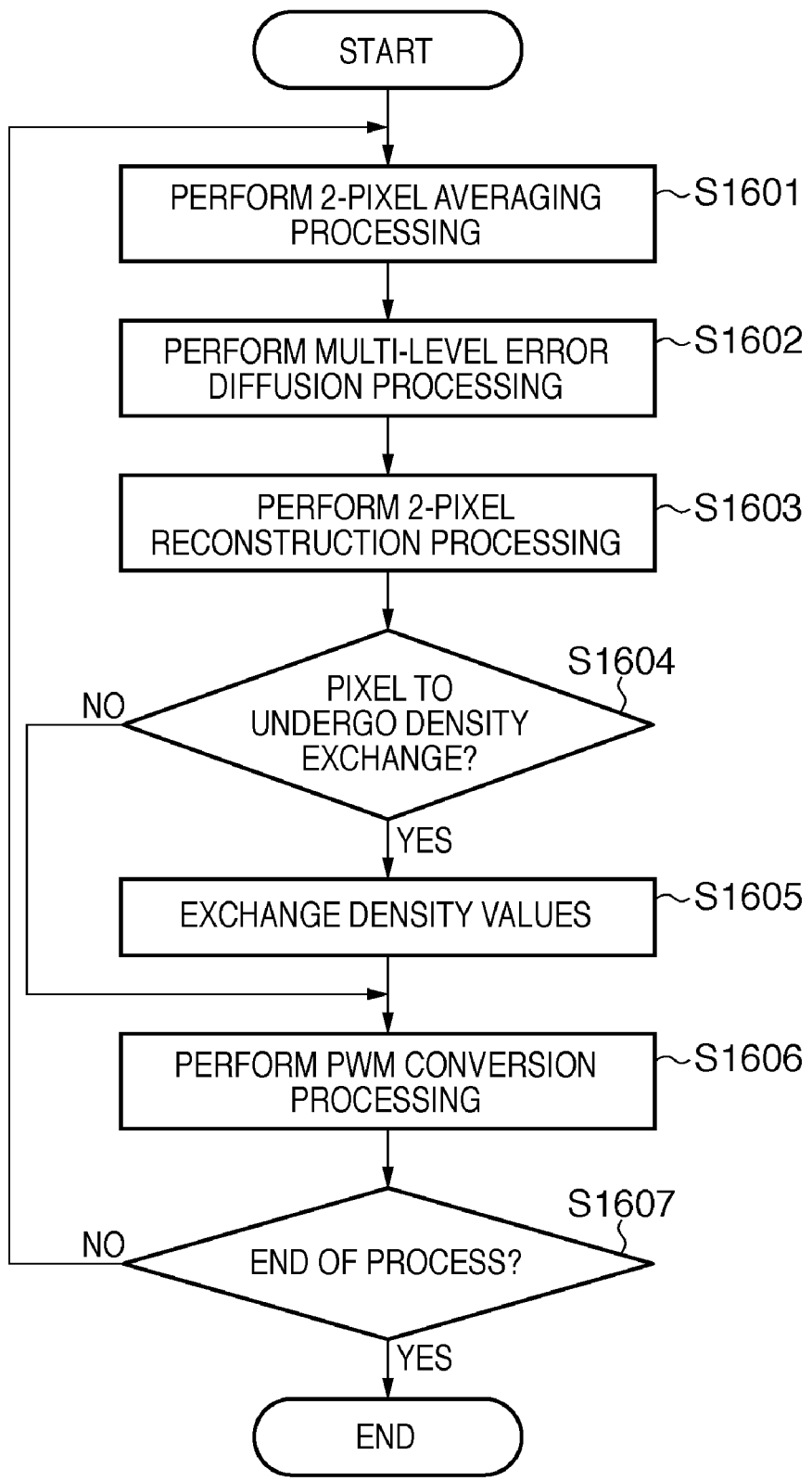
FIG. 16 is a flowchart showing image processing in the fifth embodiment.

FIG. 16 shows the sequence of image processing in the fifth embodiment. In the fifth embodiment, the image processing shown in FIG. 16 is done for all the planes of input image data. In steps S1601, S1602, and S1603, 2-pixel averaging processing, multi-level error diffusion processing, and 2-pixel reconstruction processing are performed, similar to the first embodiment described above.

In step S1604, it is determined whether to perform density exchange processing. The density exchange processing determination method will be explained with reference to FIGS. 17A to 17F.

Figure 17A:
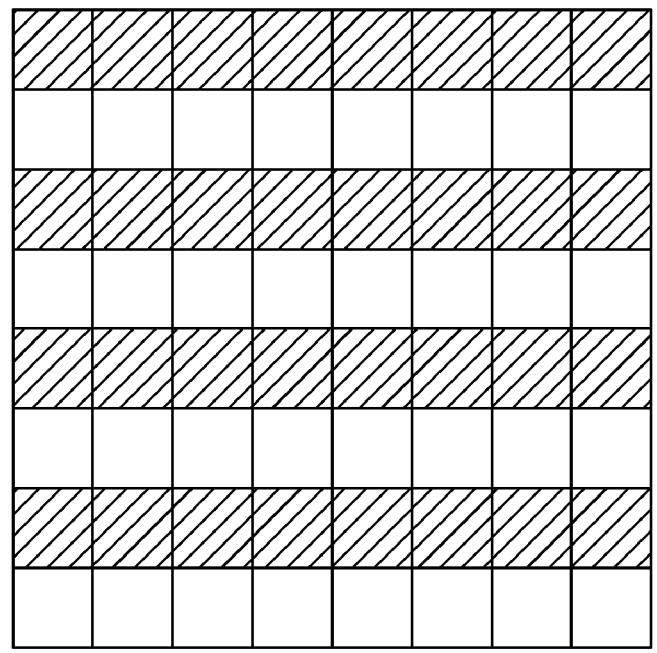
FIG. 17A is a view exemplifying an image after 2-pixel reconstruction in the fifth embodiment.

FIG. 17A exemplifies an output value by 2-pixel reconstruction processing in step S1603. When an output value from the multi-level error diffusion unit 1502 is 0 (white), the 2-pixel reconstruction unit 1503 in the fifth embodiment outputs a value other than 0 as the density value of at least one pixel as a result of 2-pixel reconstruction.

Figure 17B:
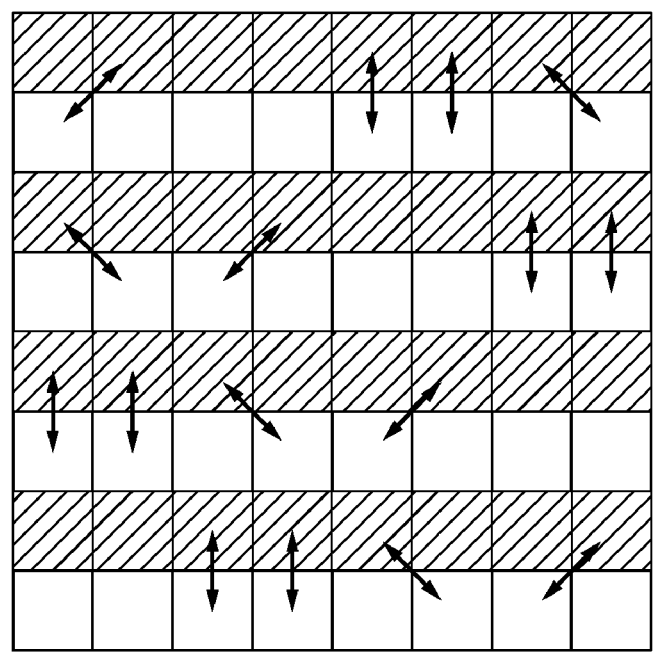
FIG. 17B is a view exemplifying a pixel to undergo density exchange in the fifth embodiment.
Figure 17C:
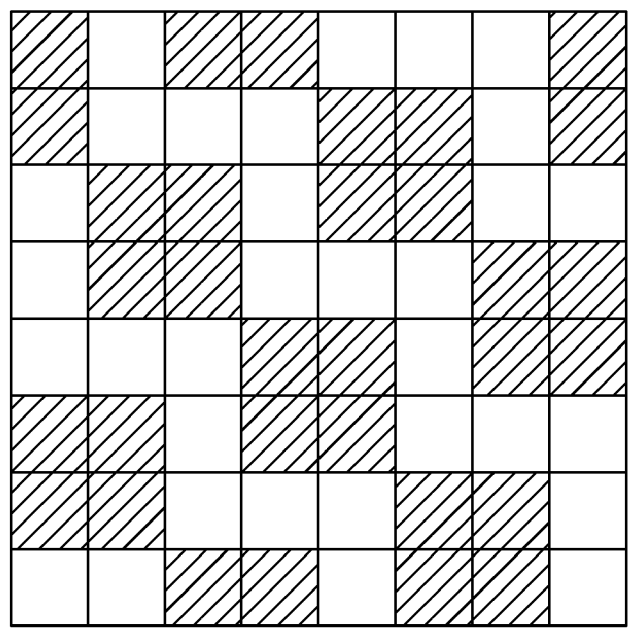
FIG. 17C is a view exemplifying an image after density exchange in the fifth embodiment.

FIG. 17B exemplifies a pixel to undergo density exchange processing. FIG. 17C exemplifies an output after the density exchange processing. In this example, density exchange processing is executed using the layout change table of the screen angle generation unit 1505 for a 2-pixel reconstruction output from the 2-pixel reconstruction unit 1503. More specifically, pixels indicated by each arrow in FIG. 17B in the input image shown in FIG. 17A are exchanged by looking up the layout change table. This density exchange processing can add a screen angle, as shown in FIG. 17C. At this time, various screen angles can be set by changing the size and layout pattern of the layout change table.

The screen generation operation of the density value exchange unit 1504 will be explained in detail.

The 2-pixel reconstruction unit 1503 outputs two pixels in the subscanning direction. The output pixels are bundled for every two pixels in the main scanning direction, forming a 2×2 block. As patterns created by exchanging high- and low-density pixels in the 2×2 block, there are six types of patterns 1700 to 1705 shown in FIG. 17D. In the pattern 1700, no pixel is exchanged. Selection numbers 0 to 5 are assigned to the patterns 1700 to 1705, respectively. By holding these exchange patterns in a table, a variety of screen angles can be generated.

Figure 17D:
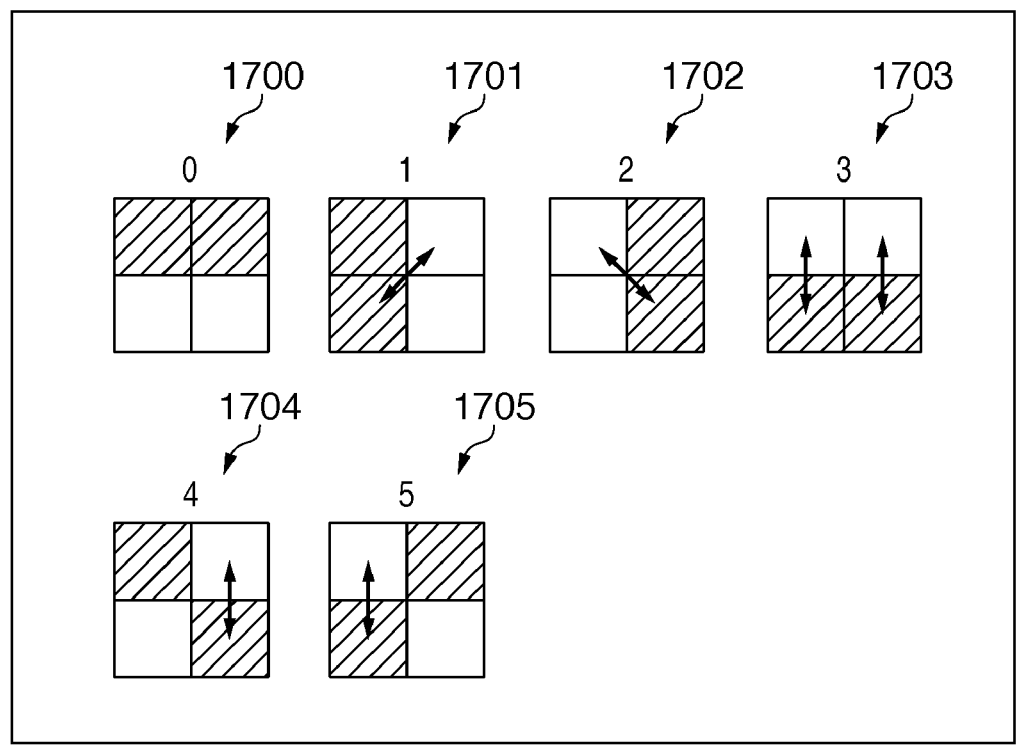
FIG. 17D is a view exemplifying a density exchange pattern in the fifth embodiment.
Figure 17E:
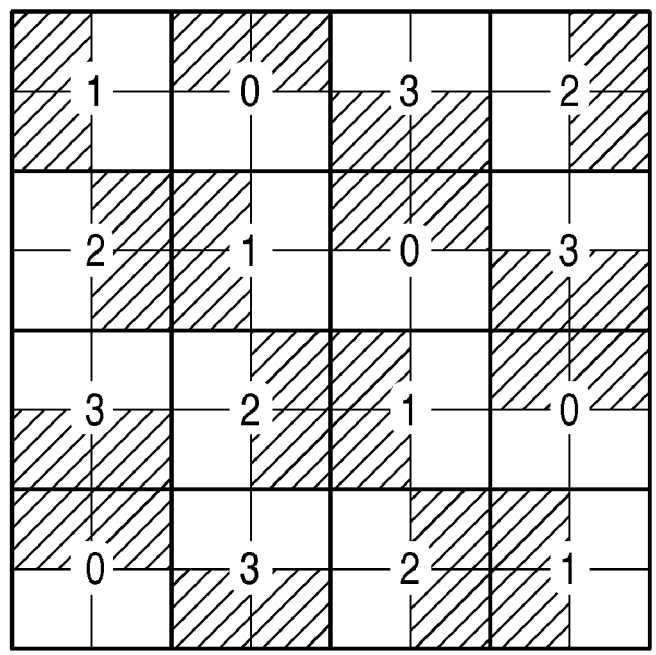
FIG. 17E is a view exemplifying the setting of a layout change table in the fifth embodiment.

FIG. 17E exemplifies the setting of the layout change table when generating screen angles in FIG. 17C. In FIG. 17E, each figure is an exchange pattern selection number. More specifically, "0" represents selection of the pattern 1700 in FIG. 17D, "1" represents selection of the pattern 1701, "2" represents selection of the pattern 1702, and "3" represents selection of the pattern 1703. These four values (1, 0, 2, 3) are stored in the layout change table. These values are read out sequentially to select a pattern corresponding to each value. This sequence is repeated to generate a screen angle.

When processing the next line, the corresponding position in the layout change table is shifted right by one. In this manner, every time 1-line processing is completed, the corresponding position is shifted right by one to perform density exchange processing. Note that a different screen angle is generated by shifting the corresponding position in the layout change table right by two (or three) every time 1-line processing is completed. Also, a different screen angle is generated by changing the readout order to (3, 0, 2, 1). That is, six screens can be implemented in the order of the four values (1, 0, 2, 3) (the order of (2, 1) is fixed to concentrate dots).

Figure 17F:
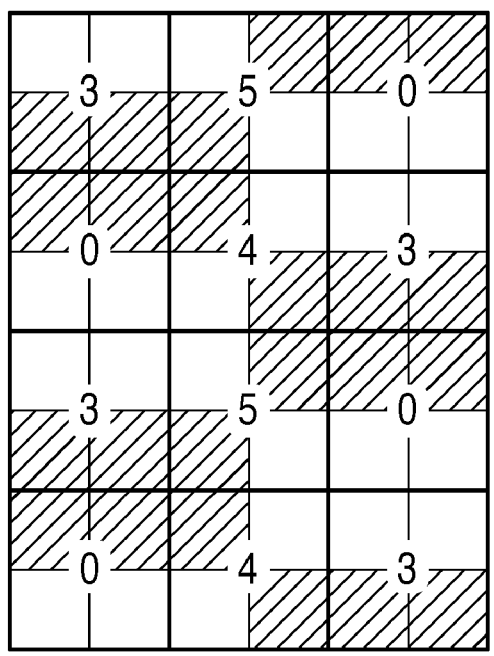
FIG. 17F is a view exemplifying the setting of the layout change table in the fifth embodiment.

FIG. 17F exemplifies a different screen generated using the patterns 1704 and 1705 in FIG. 17D. This example uses a 3×2 layout change table. Every time 1-line processing is completed, patterns (3, 5, 0) and (0, 4, 3) are alternately used.

As described above, if it is determined in step S1604 to perform density exchange processing, the above-described density exchange processing is executed in step S1605 for the image having undergone 2-pixel reconstruction processing. Then, the process advances to step S1606. If it is determined not to perform density exchange processing, the process directly advances to step S1606.

In step S1606, the output data having undergone the density exchange processing in step S1605 or 2-pixel reconstruction processing in step S1603 is converted into an exposure PWM signal, and the PWM signal is output to the printer engine. Upon completion of the series of processes, it is determined in step S1607 whether to continue the series of processes. If it is determined to continue the series of processes, the process returns to step S1601 to repeat it.

According to the above-described fifth embodiment, density exchange processing is done to give a screen angle. While suppressing color moiré, the fifth embodiment can improve graininess similarly to the first embodiment.

The fifth embodiment has described 4×4 and 4×2 tables as shown in FIGS. 17E and 17F as the layout change table. However, the layout change table is not limited to these sizes, and any layout change table is applicable as long as it has an M×N size (M and N are integers of 1 or more, and either is an integer of 2 or more).

<Sixth Embodiment>

The sixth embodiment according to the present invention will be described. The sixth embodiment is also practiced using a 4-drum type color laser beam printer having a structure as shown in FIG. 14 in the first embodiment.

Figure 18:
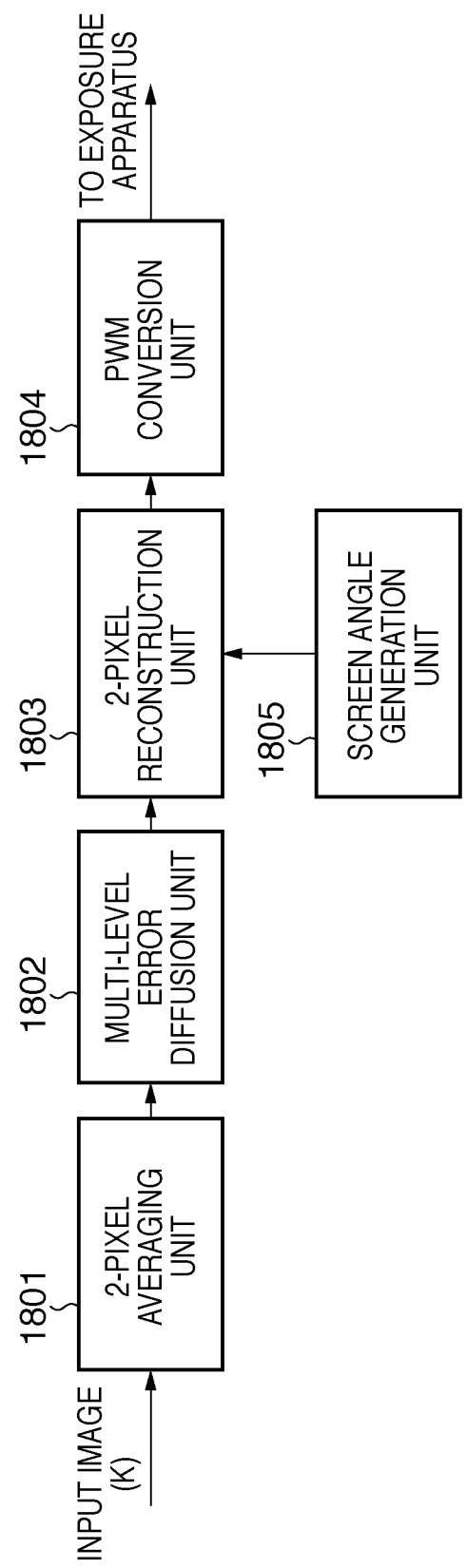
FIG. 18 is a block diagram showing the arrangement of an image forming apparatus in the sixth embodiment.

FIG. 18 is a block diagram exemplifying an arrangement for performing image processing to generate an exposure control signal based on an input image to be formed in an image forming section according to the sixth embodiment. The arrangement shown in FIG. 18 can be implemented by dedicated hardware or software.

In FIG. 18, reference numeral 1801 denotes a 2-pixel averaging unit; 1802, a multi-level error diffusion unit; 1803, a 2-pixel reconstruction unit; 1805, a screen angle generation unit; and 1806, a PWM conversion unit. In the fifth embodiment, the density value exchange unit 1504 generates a screen angle. However, the sixth embodiment omits the density value exchange unit by generating a screen angle by the 2-pixel reconstruction unit 1803. Only an arrangement different from the image forming section of the first embodiment will be explained.

FIG. 19 shows the sequence of image processing in the sixth embodiment. In the sixth embodiment, the image processing shown in FIG. 19 is done for all the planes of input image data.

In steps S1901 and S1902, 2-pixel averaging processing and multi-level error diffusion processing are performed, similar to the first embodiment described above.

In steps S1903 and S1904, 2-pixel reconstruction processing is done for the image having undergone the multi-level error diffusion processing in step S1902 by looking up one of a plurality of pixel value tables (to be simply referred to as LUTs). For this purpose, in step S1903, one of a plurality of LUTs is selected. The LUT selection method will be explained with reference to FIGS. 20A to 20C.

In the sixth embodiment, a screen is set using an 8×4 table for an output from the 2-pixel reconstruction unit 1803. For example, the screen angle generation unit 1805 has four different LUTs, and one of them is selected based on the value of the 8×4 table to set a screen. FIG. 20A exemplifies the four LUTs. In FIG. 20A, selection numbers "0" to "4" are assigned to LUTs 2001 to 2004. LUTs corresponding to the respective selection numbers are configured as follows.

1. an LUT in which an upper pixel has a higher density.
2. an LUT in which upper and lower pixel values in the LUT of selection number 1 are exchanged.
3. an LUT in which two pixels are formed from only a low-density pixel in the LUT of selection number 1.
4. an LUT in which two pixels are formed from only a high-density pixel in the LUT of selection number 1.

A method of selecting these LUTs will be described.

FIG. 20B shows an 8×4 selection table for table selection that represents the number of an LUT to be selected from the four LUTs. According to the sixth embodiment, in step S1903, the 2-pixel reconstruction unit 1803 changes an LUT to be looked up for each pixel based on the selection table of FIG. 20B. In step S1904, 2-pixel reconstruction processing is performed according to the selected LUT, obtaining a 2-pixel reconstruction output as shown in FIG. 20C. That is, density exchange processing to give a screen angle can be executed at the same time as 2-pixel reconstruction.

The sixth embodiment can implement various screen angles by changing the size of the selection table shown in FIG. 20B and the selection number of a stored LUT. The screen angle can be changed for each color plane by changing the selection table for each color plane.

In this example, four LUTs are selected. However, the present invention is not limited to this example, and four patterns may be generated from one LUT. For example, in 2-pixel reconstruction, upper and lower pixel values in the LUT of selection number 1 are exchanged and used as an output of selection number 2. Also, the lower pixel value in the LUT of selection number 1 is used as an output of selection number 3, and the upper pixel value in the LUT of selection number 1 is used as an output of selection number 4.

In the 8×4 selection table shown in FIG. 20B, the start position of a pattern (4, 3, 1, 1, 2, 2, 3, 4) is shifted right by two pixels every time the line changes. Thus, for example, only an 8×1 selection table may be stored to shift the readout position of the selection table right by two pixels at the start of a line.

In step S1905, the output data in which the 2-pixel reconstruction unit 1803 generates a screen angle is converted into an exposure PWM signal, and the PWM signal is output to the printer engine. Upon completion of the series of processes, it is determined in step S1906 whether to continue the series of processes. If it is determined to continue the series of processes, the process returns to step S1901 to repeat it.

According to the above-described sixth embodiment, density exchange is done to give a screen angle in 2-pixel reconstruction. While suppressing color moiré, the sixth embodiment can improve graininess similarly to the first embodiment.

The sixth embodiment has described an 8×4 table as shown in FIG. 20B as the selection table. However, the selection table is not limited to this size, and any selection table is applicable as long as it has an M×N size (M and N are integers of 1 or more, and either is an integer of 2 or more).

In the above-described first to sixth embodiments, two pixels of an input image are averaged, and reconstructed after multi-level error diffusion. However, the unit in the present invention is not limited to two pixels, and H-pixel averaging processing and H-pixel reconstruction processing may be executed for H pixels (H is a natural number of 2 or more). More specifically, the size in the subscanning direction is reduced to 1/H by averaging H pixels in the subscanning direction in an input image. Then, multi-level error diffusion processing and H-pixel reconstruction processing are performed.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-274865, filed Oct. 24, 2008, which is hereby incorporated by reference herein in its entirety.

What is claimed is:

1. An image forming apparatus which forms a visible image by exposure scanning and development on an image carrier and transfers the visible image to a print medium, the apparatus comprising:
    an averaging unit configured to average H adjacent pixels in a subscanning direction serving as a conveyance direction of the print medium in an input image, thereby reducing a size of the input image to 1/H in the subscanning direction, wherein H is not smaller than 2;
    a multi-level error diffusion unit configured to perform multi-level error diffusion processing for each averaged pixel in an output image from the averaging unit;
    an H-pixel reconstruction unit configured to replace each averaged pixel that has been multi-level error-diffusion processed in an output image from the multi-level error diffusion unit with H reconstructed adjacent pixels, which have been expanded from the corresponding averaged pixel that has been multi-level error-diffusion processed, in the subscanning direction;

an exchange unit configured to exchange pixel values of the H reconstructed adjacent pixels in an output image from the H-pixel reconstruction unit; and a generator configured to generate an exposure control signal for performing the exposure scanning, based on an output image from the exchange unit.

2. The apparatus according to claim 1, wherein when a value output from the multi-level error diffusion unit is 0, the H-pixel reconstruction unit outputs a value other than 0 as a density value of at least one pixel out of the H reconstructed adjacent pixels.

3. The apparatus according to claim 1, wherein the exchange unit has a table of an M×N size, where M and N are integers not smaller than 1, and either of M or N is an integer not smaller than 2, and exchanges the pixel values of the H reconstructed adjacent pixels based on the table.

4. The apparatus according to claim 1, wherein the exchange unit exchanges the pixel values of the H reconstructed adjacent pixels in the subscanning direction in each of H×H pixel blocks arranged in a checkered pattern in an output image.

5. The apparatus according to claim 1, wherein the exchange unit exchanges the pixel values of a specific color component plane of the H reconstructed adjacent pixels, while not exchanging the pixel values of other color component planes of the H reconstructed adjacent pixels.

6. The apparatus according to claim 5, wherein the specific color component plane is a black plane.

7. A method of controlling an image forming apparatus that forms a visible image by exposure scanning and development on an image carrier, and transfers the visible image to a print medium, the method comprising:

an averaging step of averaging H adjacent pixels in a subscanning direction serving as a conveyance direction of the print medium in an input image, thereby reducing a size of the input image to 1/H in the subscanning direction, wherein H is not smaller than 2;

a multi-level error diffusion step of performing multi-level error diffusion processing for each averaged pixel in an output image from the averaging step;

an H-pixel reconstruction step of replacing each averaged pixel that has been multi-level error-diffusion processed in an output image from the multi-level error diffusion step with H reconstructed adjacent pixels, which have been expanded from the corresponding averaged pixel that has been multi-level error-diffusion processed, in the subscanning direction;

an exchange step of exchanging pixel values of the H reconstructed adjacent pixels in an output image from the H-pixel reconstruction step; and a generation step of generating an exposure control signal for performing the exposure scanning, based on an output image from the exchange step.

8. A non-transitory computer-readable storage medium storing a program executable by a computer to carry out a method comprising:

an averaging step of averaging H adjacent pixels in a subscanning direction serving as a conveyance direction of the print medium in an input image, thereby reducing a size of the input image to 1/H in the subscanning direction, wherein H is not smaller than 2;

a multi-level error diffusion step of performing multi-level error diffusion processing for each averaged pixel in an output image from the averaging step;

an H-pixel reconstruction step of replacing each averaged pixel that has been multi-level error-diffusion processed in an output image from the multi-level error diffusion step with H reconstructed adjacent pixels, which have been expanded from the corresponding averaged pixel that has been multi-level error-diffusion processed, in the subscanning direction;

an exchange step of exchanging pixel values of the H reconstructed adjacent pixels in an output image from the H-pixel reconstruction step; and a generation step of generating an exposure control signal for performing the exposure scanning, based on an output image from the exchange step.

* * * * *